United States Patent [19]
Urabe et al.

[11] Patent Number: 5,333,251
[45] Date of Patent: Jul. 26, 1994

[54] DATA PROCESSING METHOD AND SYSTEM

[75] Inventors: Shou Urabe, Kawasaki; Hideo Mutoh, Yokohama; Shigeru Yoneda, Ebina, all of Japan

[73] Assignees: Hitachi, Ltd.; Hitachi Microcomputer System, Ltd., both of Tokyo, Japan

[21] Appl. No.: 706,584

[22] Filed: May 28, 1991

[30] Foreign Application Priority Data

May 30, 1990 [JP] Japan .................................. 2-142190

[51] Int. Cl.⁵ .............................................. G06F 15/62
[52] U.S. Cl. ................................................. 395/146
[58] Field of Search ............... 395/155, 161, 144, 145, 395/146, 148, 162, 163; 400/83, 63; 345/23, 25

[56] References Cited

U.S. PATENT DOCUMENTS 5,167,016  11/1992  Bagley et al. ................... 395/144
5,220,648  6/1993   Sato ................................. 395/146

OTHER PUBLICATIONS

C. J. Date, An Introduction to Database Systems, vol. 1, Fourth Edition pp. 127–147, 1986.

Primary Examiner—Phu K. Nguyen
Attorney, Agent, or Firm—Fay, Sharpe, Beall, Fagan, Minnich & Mckee

[57] ABSTRACT

A data processing system capable of searching for desired data requested by a computer from a memory unit. To obviate a disadvantage that the computer has read data partially including desired data from the memory unit and selected the desired data from the read data, the data processing system is provided with a data processing unit connected to a control unit for controlling a memory unit. Desired data is selected by this data processing unit.

14 Claims, 47 Drawing Sheets

- ☐ UNEDITED PAGE
- ▱ EDITED PAGE
- ▱ PAGE WITHOUT REQUESTED RECORDS
- ▨ UNUSED SLOT

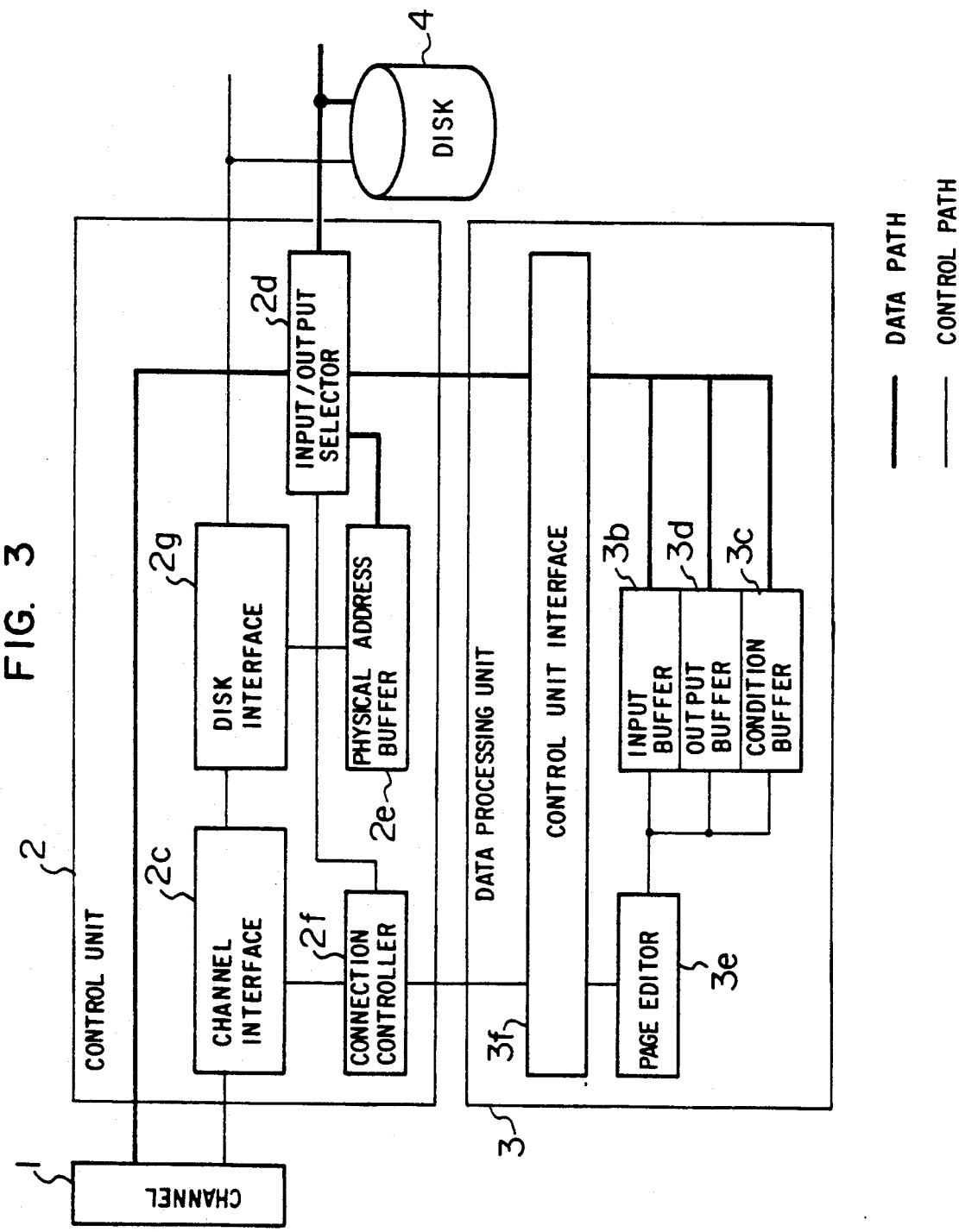

FIG. 14
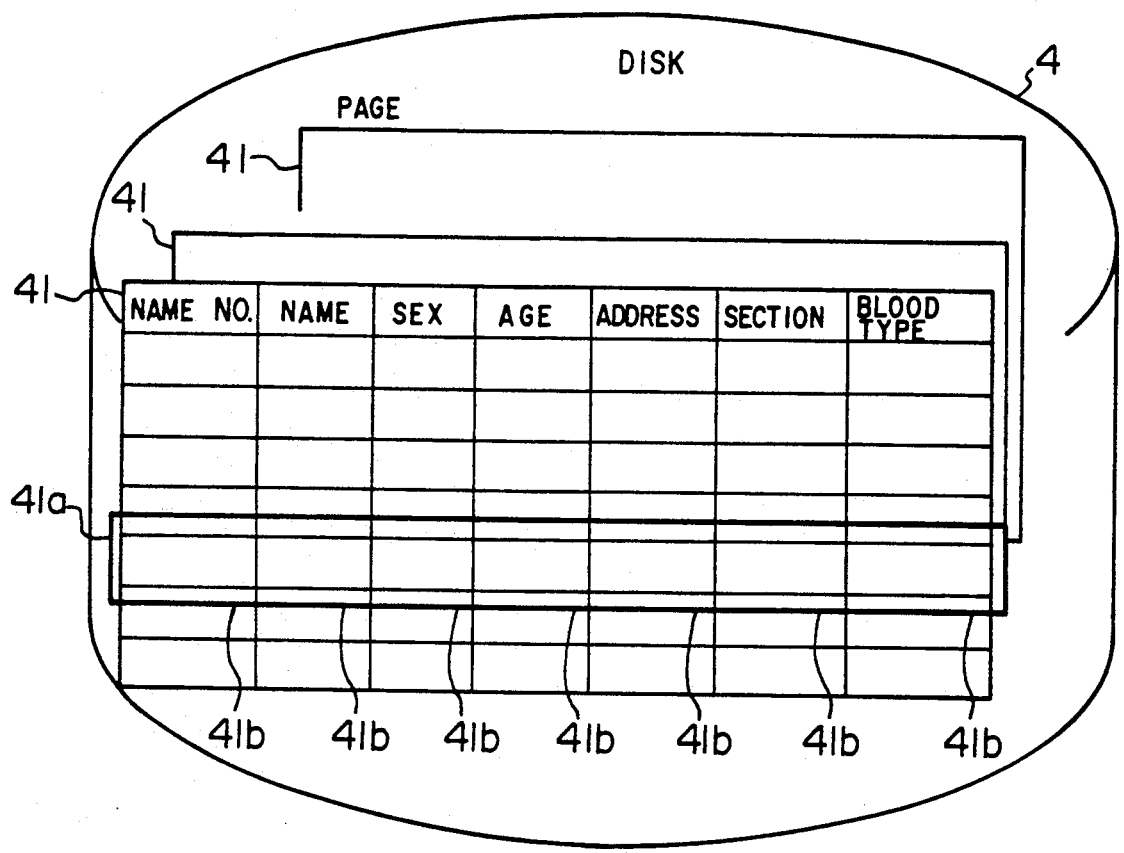
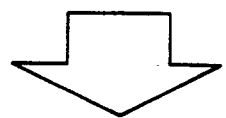
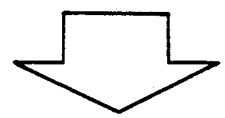

FIG. 27

UNIT ADDRESS 12
- 12a: CONTROL UNIT ADDRESS
- 12b: DISK ADDRESS

FIG. 28

| INPUT SIGNAL / DATA MOVEMENT | NO INPUT SIGNAL | CONDITION OUTPUT SIGNAL | DATA INPUT SIGNAL | DATA OUTPUT SIGNAL | PHYSICAL ADDRESS SIGNAL |
|---|---|---|---|---|---|
| IN | DISK | CHANNEL | DISK | OUTPUT BUFFER | CHANNEL |
| OUT | CHANNEL | CONDITION BUFFER | INPUT BUFFER | CHANNEL | PHYSICAL ADDRESS BUFFER |
| TYPE OF DATA | DATABASE | CONDITION DATA | DATABASE | DATABASE | PHYSICAL ADDRESS DATA |

(1) CONDITION OUTPUT (2) PHYSICAL ADDRESS TRANSFER

DATA PROCESSING METHOD AND SYSTEM

BACKGROUND OF THE INVENTION

The present invention relates to a data processing method and system for an input/output processing unit which executes retrieval processing, compare operations and set operations of a database management system (DBMS) at a high speed.

Conventionally, control unit and input/output unit such as a disk storage device are respectively assigned a unit address which is a unique identifier thereof. When a unit address is broadcasted together with an access request from a central processing unit, input/output unit, whose unit address is equal to the address, fetches the access request and performs processing. These unit addresses are assigned with hardware configuration definition for input/output units at system generation in a computer system.

For effectively utilizing information, the user requires that a database system provides better functions for (1) easy-learning, (2) use-friendly interface, or (3) high-performance.

A relational database (RDB) meets the above requirements (1) and (2) because of its simple table-type logical data structure.

Conventionally, database machines are often placed behind a host computer or a central processing unit so as to distribute loads of the central processing unit. However, such a structure causes heavy communication overhead between the database machine and the host computer. Also, the database machine has to provide a lot of complicated functions for database processing. A technique related to a CPU built-in type database processor for enhancing the processing speed of a relational database is proposed, for example, in "Nikkei Electronics", No. 414, pp. 185-206 (Feb. 9, 1987).

On the other hand, there has been proposed another configuration in which a data processing unit is disposed between a general-purpose host computer and a disk control unit. The data processing unit performs editing of pages (data) read out from a database efficiently. This data processing unit processes data-base access requirements for data stored in storage devices under the control unit. This configuration requires to define the data processing unit with hardware configuration definition and assign its unit address at system generation. Also, when a processing program in the host computer utilizes functions of the data processing unit, the processing program has to check the hardware configuration to confirm that a disk storage device to be accessed is connected to the data processing unit via disk control unit, and then issue access requests with the address of the data processing unit.

SUMMARY OF THE INVENTION

It is an object of the present invention to provide a data processing method and system which are capable of connecting a data processing unit at an arbitrary time without making a processing program which issues an access request take into account a connection condition of an input/output unit.

The above-mentioned object is based on the following problems which have been recognized with respect to the prior art:

As described above, the configuration of placing a data processing unit between a host computer and a control unit implies problems in the following aspects:

(a) Since it is necessary to previously define a connection configuration of the data processing unit and a unit address thereof, an operating system (OS) must be generated every time the data processing unit is introduced and is cut from the configuration.

(b) A processing program utilizing functions of the data processing unit first determines whether or not data to be accessed is stored in a disk storage device under the control unit connected to the data processing unit, so that it is necessary to check a connection relation of the input/output unit which was defined at the stage of the system generation.

(c) A processing program when utilizing functions of a data processing unit, designates the address of the data processing unit, and designates the address of a control unit when not utilizing the same, so that it is necessary to change the address depending on a unit to be utilized by the processing program, even if identical data is to be accessed.

To achieve the aforementioned object, the data processing unit is connected to the control unit, not to the host computer in a preferred embodiment of the present invention. On the assumption of such a configuration:

(1) The control unit includes a connection control module which permits the control unit to be connected with the data processing unit at an arbitrary time. The control unit, when receiving a data access request from a processing program of the host computer, requests the data processing unit to execute processing if the data processing unit is connected to the control unit. The data processing unit reads pages from a disk of an input/output unit connected to the control unit, selects records (data) required by the processing program and transfers the selected records to the processing program. When the data processing unit is not connected to the control unit, the control unit transfers pages to the host computer;

(2) The data processing unit includes a page edit module which manages information indicating that the data processing unit processes this page, and information indicative of the presence or absence of records requested by the processing problem in each page; and (3) The host computer includes a record interface module which examines a page transferred from the control unit, and extracts records requested by the processing program from the transferred page and delivers the extracted records to the processing program when it is detected that the transferred page has been edited by the page edit module provided in the data processing unit.

The present invention achieves its object by means of a collaboration of the connection control module in the control unit, the page edit module in the data processing unit and the record interface module in the host computer. More specifically, (1) the connection control module in the control unit permits the control unit to be connected with the data processing unit at an arbitrary or optional manner. Then, in response to a request from a processing program, the control unit requests the data processing unit to perform processing if the data processing unit is connected to the control unit, whereas the control unit transfers data in page units to the host computer if the data processing unit is not connected thereto.

(2) The page edit module in the data processing unit, when receiving a processing request after the data processing unit is connected with the control unit, selects records requested by a processing program, stores information indicative of the presence or absence of the requested records in a page, and transfers the page to the control unit.

(3) The record interface module in the host computer examines a page transferred from the control unit, and extracts records requested by the processing program from the transferred page and delivers the extracted records to the processing program based on information stored by the page edit module in the data processing unit.

Thus, even if the data processing unit is connected or disconnected at an arbitrary time, a data access request can be normally processed, whereby the user need not pay attention to the connecting condition of the data processing unit.

BRIEF DESCRIPTION OF THE DRAWINGS

The objects and features of the invention will best be understood from a detailed description of preferred embodiments thereof, selected for purposes of illustration and shown in the accompanying drawings, in which:

FIG. 3 is a functional diagram of the control unit and the data processing unit shown in FIG. 1;

FIG. 14 is a diagram showing the structure of data stored in a disk;

FIG. 27 is a diagram showing a format of a unit address;

FIG. 28 is a table showing the relationship between data movements and inputted signals;

DESCRIPTION OF THE PREFERRED EMBODIMENTS

Embodiments of the present invention will hereinbelow be explained in detail with reference to the accompanying drawings.

Figure 1:
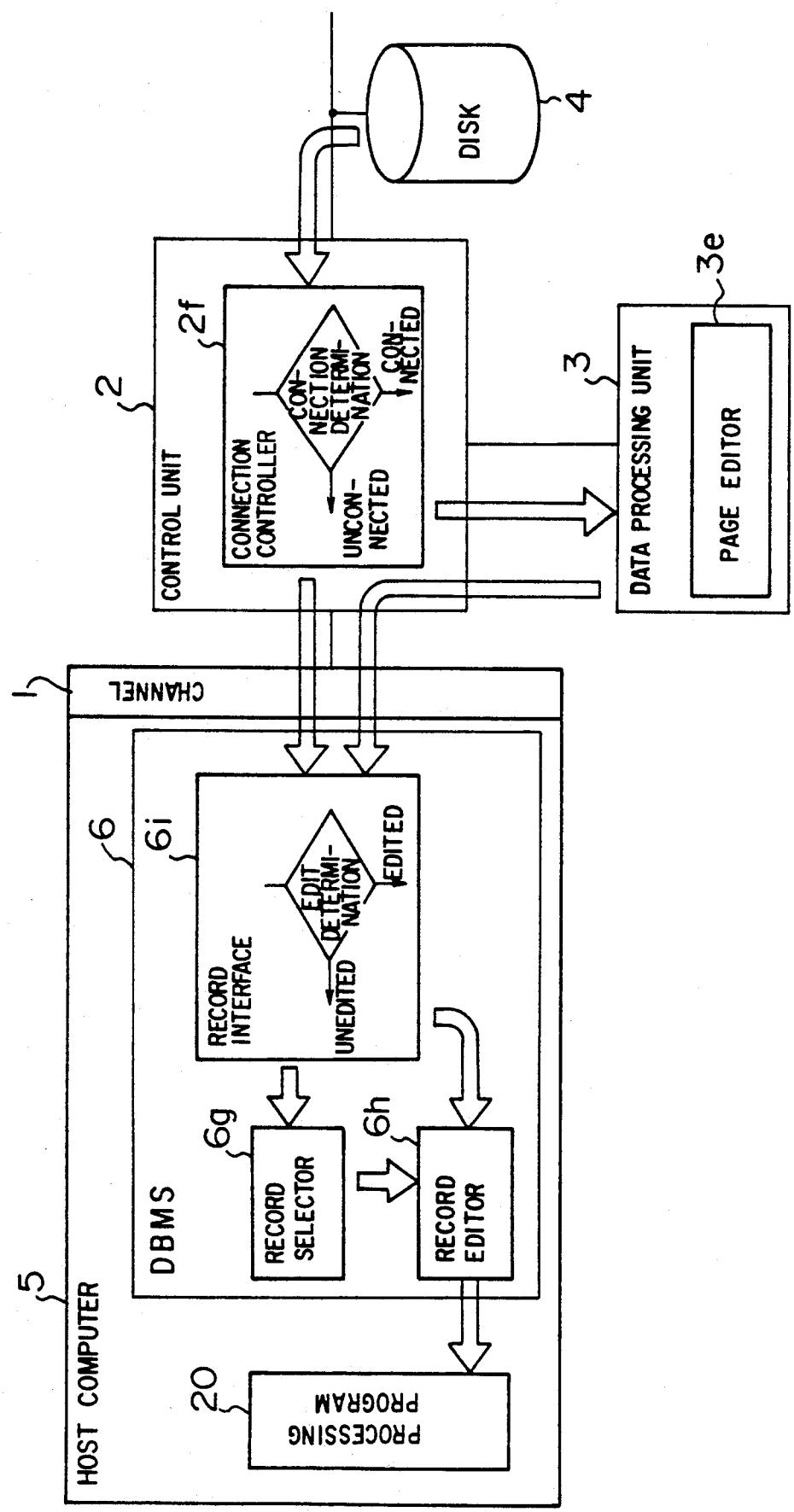
FIG. 1 is a block diagram showing a data processing system according to a first embodiment of the present invention.

FIG. 1 shows the whole configuration of a data processing system of a first embodiment.

In FIG. 1, reference numeral 5 designates a general-purpose host computer (a central processing unit), 1 a channel connected to the host computer 5, 2 a control unit connected to a disk (databases) 4 for controlling the disk 4 as well as input/output of data, 3 a data processing unit connected to the control unit 2, and 4 the disk for storing databases. Arrows illustrated between respective units indicate data paths while single lines indicate paths through which commands and control information are transferred.

In this embodiment, the host computer 5 includes a database management system (DBMS) 6 for issuing a data operation request to the data processing unit 3 and executes a processing program 20 for issuing a data processing request to the DBMS 6.

The DBMS 6 comprises a record selector 6g, a record editor 6h and a record interface 6i. The control unit 2 comprises a connection controller 2f, while the data processing unit 3 comprises a page editor 3e.

The DBMS 6 receives a data processing request from the processing program 20, analyzes the data processing request, and generates search condition information (conditions for record selection) and an edit condition information (directions for editing the selected records). Next, the DBMS 6 calculates the physical address of data in the database (the address of each page to be read) and generates physical address information (address). The DBMS 6 also reserves a buffer area necessary for reading the data and generates a buffer list including buffer addresses. Subsequently, the DBMS 6 issues a data operation request to the control unit 2 with the search condition information, the physical address information and the buffer list described above. The control unit 2 read pages from the disk 4.

The connection controller 2f of the control unit 2 transfers each page from the disk 4 to the data processing unit 3 if the data processing unit 3 is connected to the control unit 2. If the data processing unit 3 is not connected to the control unit 2, the connection controller 2f transfers the pages to the DBMS 6 directly.

The page editor 3e of the data processing unit 3, when receiving the page that includes records from the control unit 2, invalidates the records which do not satisfy the search condition describing which records are to be selected. The page editor 3e also writes in the page information indicating that the data processing unit 3 process this page, and stores the page in the buffer pointed by each entry of the buffer list through the control unit 2. If all records in the page do not satisfy the search condition, the page editor 3e writes in the page information indicating that requested data does not exist in this page to prevent DBMS 6 from processing records in this page later again.

The record interface 6i of the DBMS 6 examines the page stored in the buffer, and determines whether this page is edited (records which do not satisfy the search condition have been selectively invalidated) by the page editor 3e or not. The record interface 6i delivers the page to the record editor 6h, if the page has been edited. If it has not been edited, the record interface 6i delivers it to the record selector 6g. If the edited page does not include records that satisfy the search condition, the record interface 6i proceeds to process the next page (a page stored in the next buffer). The record selector 6g, when receiving the page from the record interface 6i, invalidates records which do not satisfy the search condition in the page, and delivers the page to the record editor 6h. The record editor 6h, when receiving the page from the record interface 6i or the record selector 6g, edits selected records stored in the received page in accordance with an edit condition information, and delivers the result to the processing program 20.

By the above-mentioned operation, the processing program 20 need not pay attention to whether or not the data processing unit 3 is connected to the control unit 2 at issuing a data processing request.

The page editor 3e may mark records for indicating that they satisfy the search condition. But, in the present embodiment, we assume that the page editor 3e invalidates records that do not satisfy the search condition.

Figure 2A:
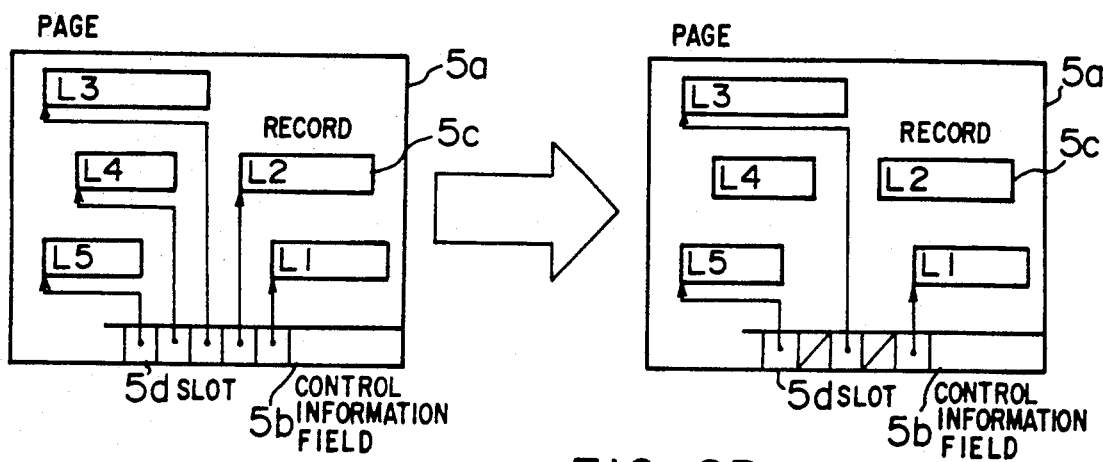
FIGS. 2A and 2B are diagrams showing the structures of page data processed by the system of FIG. 1.
Figure 2B:
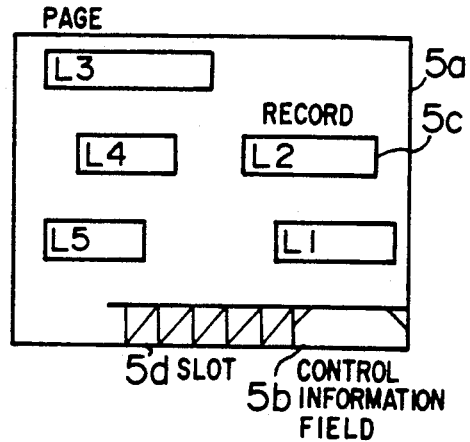

FIGS. 2A and 2B are explanatory diagrams of a page configuration and the processing performed by the page editor 3e of the data processing system of the present embodiment.

In FIG. 2A, reference 5a designates a page, 5b a control information field for managing the use of the page 5a, 5c records, and 5d slots for pointing the records 5c.

Suppose that five records L1, L2, L3, L4 and L5 are stored in the page 5a, as shown in the drawings and that the records L2 and L4 do not satisfy the search condition. The page editor 3e, as shown in FIG. 2A, sets slots pointing the records L2 and L4 to an unused state, changes the control information field 5b to indicate that this page is edited (cutting the corner), and transfers the page 5a to the DBMS 6 through the control unit 2. If no records satisfy the search condition, the page editor 3e changes the control information field 5b to indicate that requested records do not exist in the page (cutting both corners) as shown in FIG. 2B.

The record interface 6i determines whether the transferred page 5a is a page edited by the data processing unit 3, and whether it includes requested records by referring the control information field 5b, and delivers the page 5a to the record selector 6g or the record editor 6h.

FIG. 3 shows in detail the control unit 2 and the data processing unit 3 appearing in FIG. 1.

Here, a detailed description will be given of the feature of the invention that the data processing unit 3 can be connected to the control unit 2 at an arbitrary time. The control unit 2 is composed of (a) the connection controller 2f, (b) a channel interface 2c for receiving a channel command, (c) a disk interface 2g for accessing data by driving the disk 4, (d) the input/output selector 2d for switching input/output of data in accordance with a connecting state of the data processing unit 3 (connected or disconnected), and (e) a physical address buffer 2e for storing physical address information of data.

The data processing unit 3 is composed of (a) the page editor 3e, (b) an input buffer 3b, (c) an output buffer 3d for storing the edited result, (d) a condition buffer 3c for keeping conditions necessary to edit, and (e) control unit interface 3f for controlling data inputted to and outputted from the respective buffers.

In FIG. 3, data paths between the above-mentioned elements are represented by thick lines and control paths by thin lines.

Figure 5:
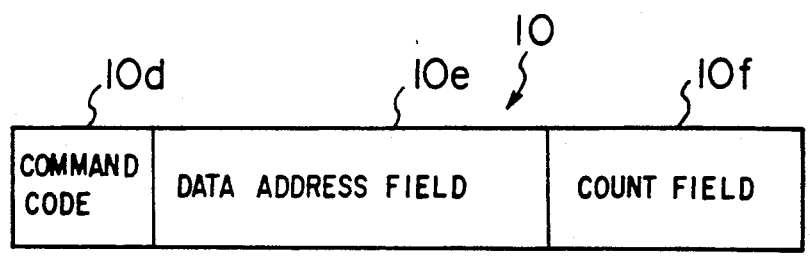
FIG. 5 is a diagram showing a data format of a channel command word.

FIG. 5 shows the structure of a channel command word which is issued by the channel 1 to the control unit 2 shown in FIG. 1.

A channel command word 10 is composed of a command code 10d, a data address field 10e and a count field 10f.

Figure 6:
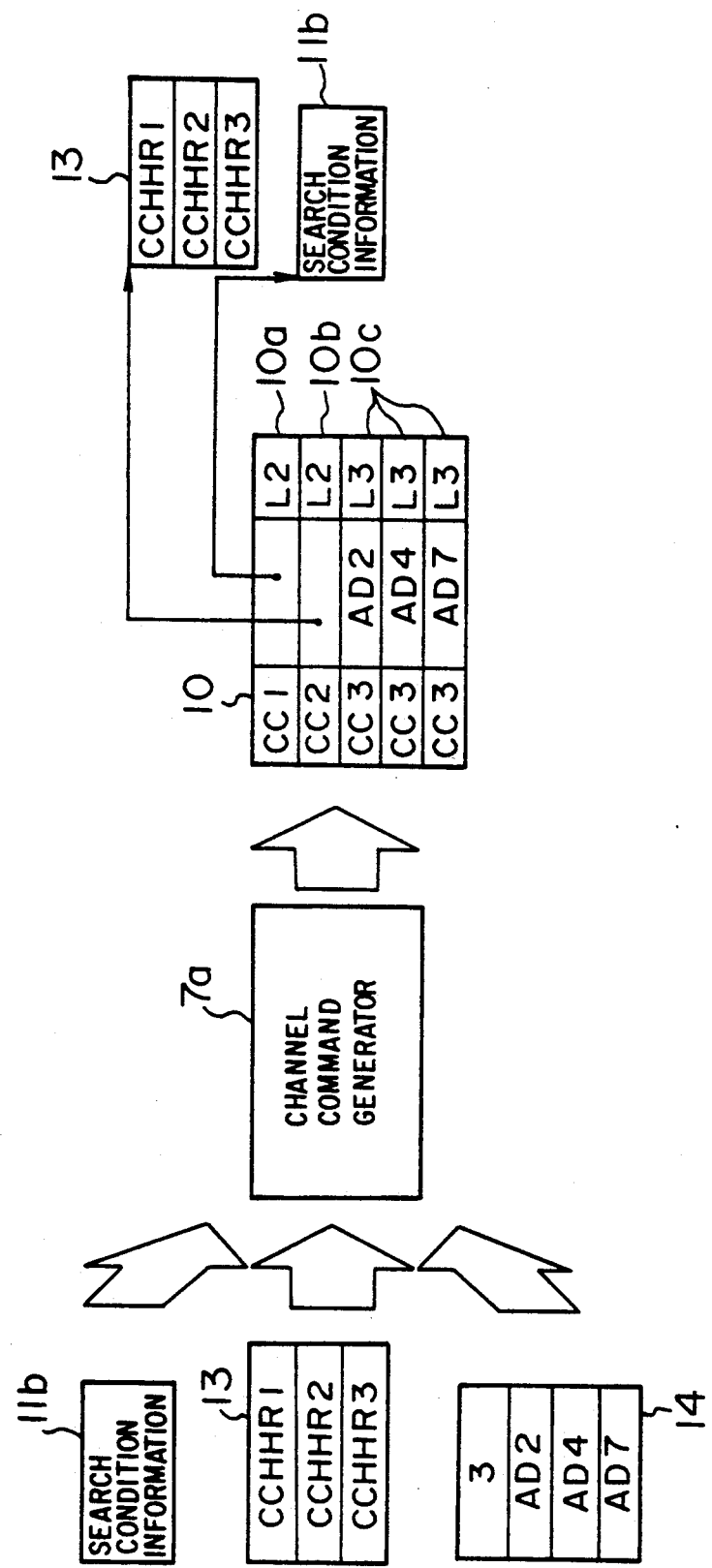
FIG. 6 is a diagram roughly showing the operation of a channel command generator.

FIG. 6 illustrates how a channel command word chain is generated by a channel command generator 7a (not shown in FIG. 1) disposed between the DBMS 6 and the channel 1 shown in FIG. 1.

The channel command generator 7a, upon receiving an input/output request from the DBMS 6, generates a channel command word chain and delivers this chain to the channel 1. More specifically, the channel command generator 7a receives search condition information 11b, physical address information 13 and an assigned buffer list 14, generates a search condition transfer command 10a for transferring the search condition information 11b, a physical address transfer command 10b for transferring the physical address information 13, and a data input command 10c, and forms a chain of these commands in the order shown in FIG. 6. In this example, the chain includes three data input commands 10c. The command chain word 10a positioned at the head of the chain is the search condition transfer command 10a for transferring the search condition information. The channel interface 2c, upon receiving this command, starts the connection controller 2f in a search condition information transfer mode.

Figure 7:
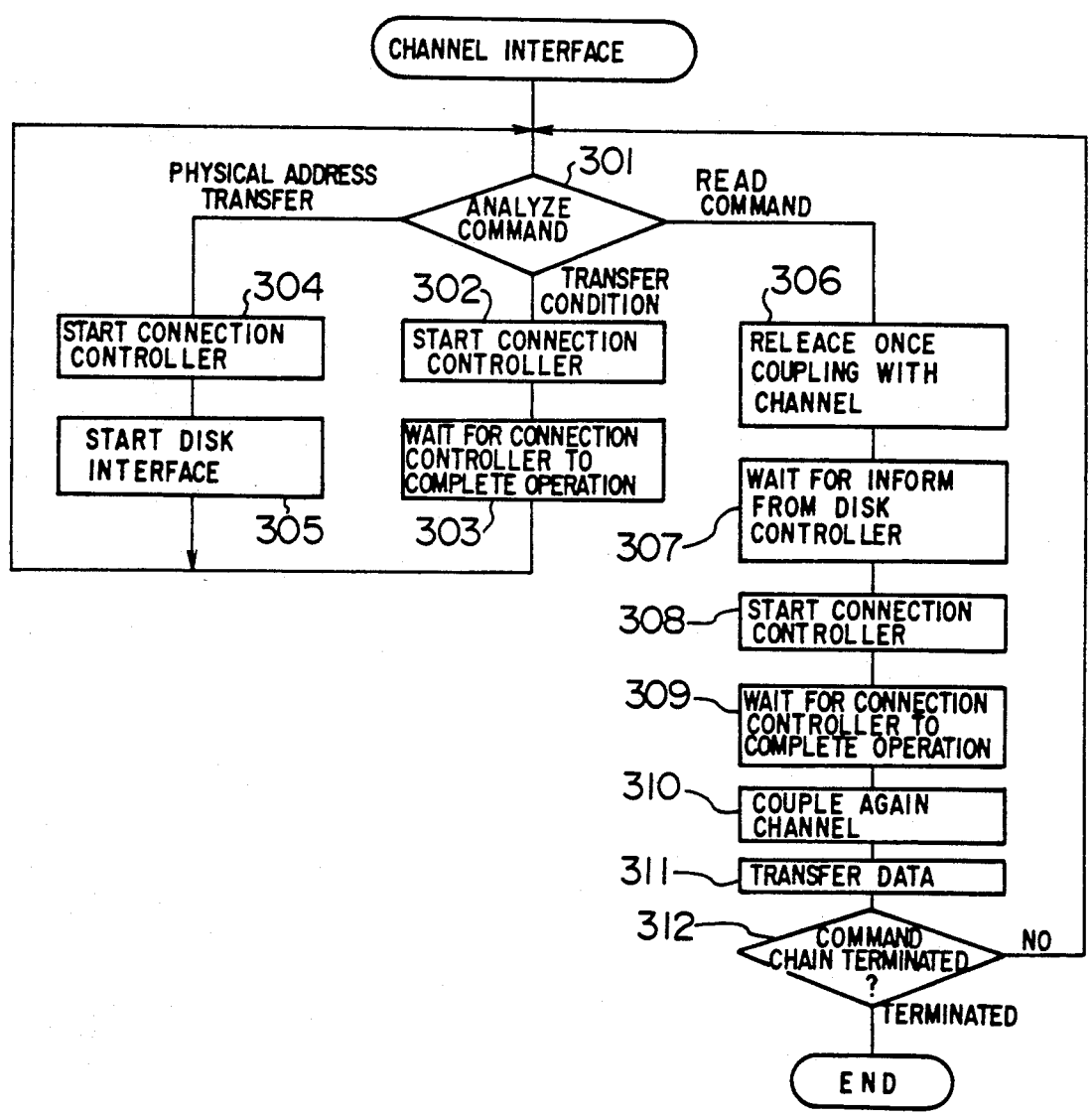
FIG. 7 is a flowchart showing the processing of a channel interface of the first embodiment.
Figure 8:
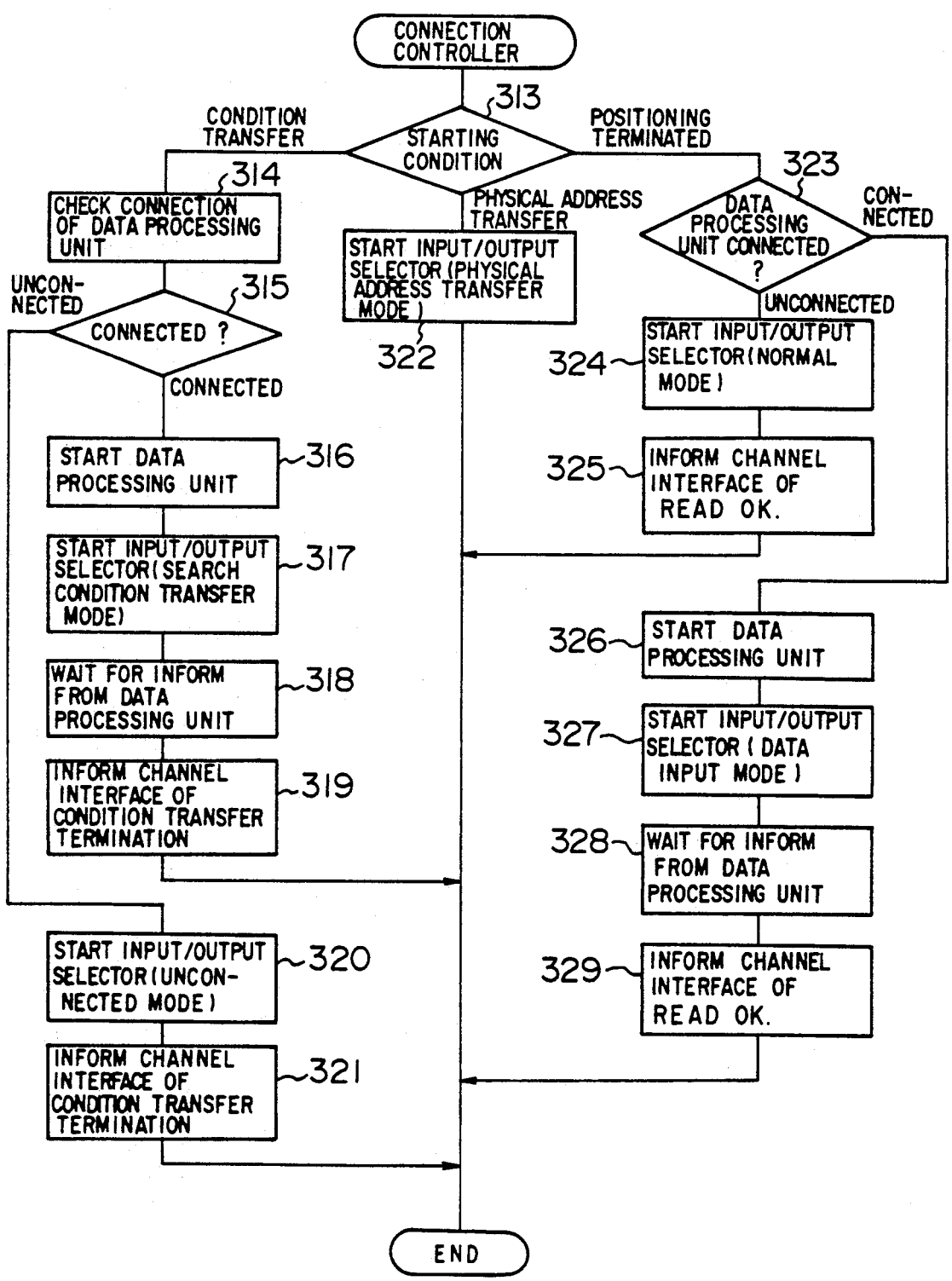
FIG. 8 is a flowchart showing the processing of a connection controller of the same.

FIG. 7 is a flowchart showing the operation of the channel interface 2c provided in the control unit 2 while FIG. 8 a flowchart showing the operation of the connection controller 2f.

The channel interface 2c, upon receiving the search condition information command 10a for transferring the search condition information, first analyzes the command (step 301), starts the connection controller 2f (step 302), and waits for the connection controller 2f to complete its operation (step 303), as shown in FIG. 7.

The connection controller 2f examines whether or not the data processing unit 3 is connected to the control unit 2 (step 314) as shown in FIG. 8. If it is connected (step 315), the connection controller 2f starts the control unit interface 3f and the input/output selector 2d of the data processing unit 3 in a search condition information transfer mode (steps 316, 317). Then, the connection controller 2f waits for a report from the data processing unit 3 (step 318), and informs the channel interface 2c that a condition transfer has been completed (step 319). On the contrary, if the data processing unit 3 is not connected to the control unit 2 (step 315), the connection controller 2f starts the input/output selector 2d in an unconnected mode (step 320), and informs to the channel interface 2c that a condition transfer has been completed (step 312).

Figure 9:
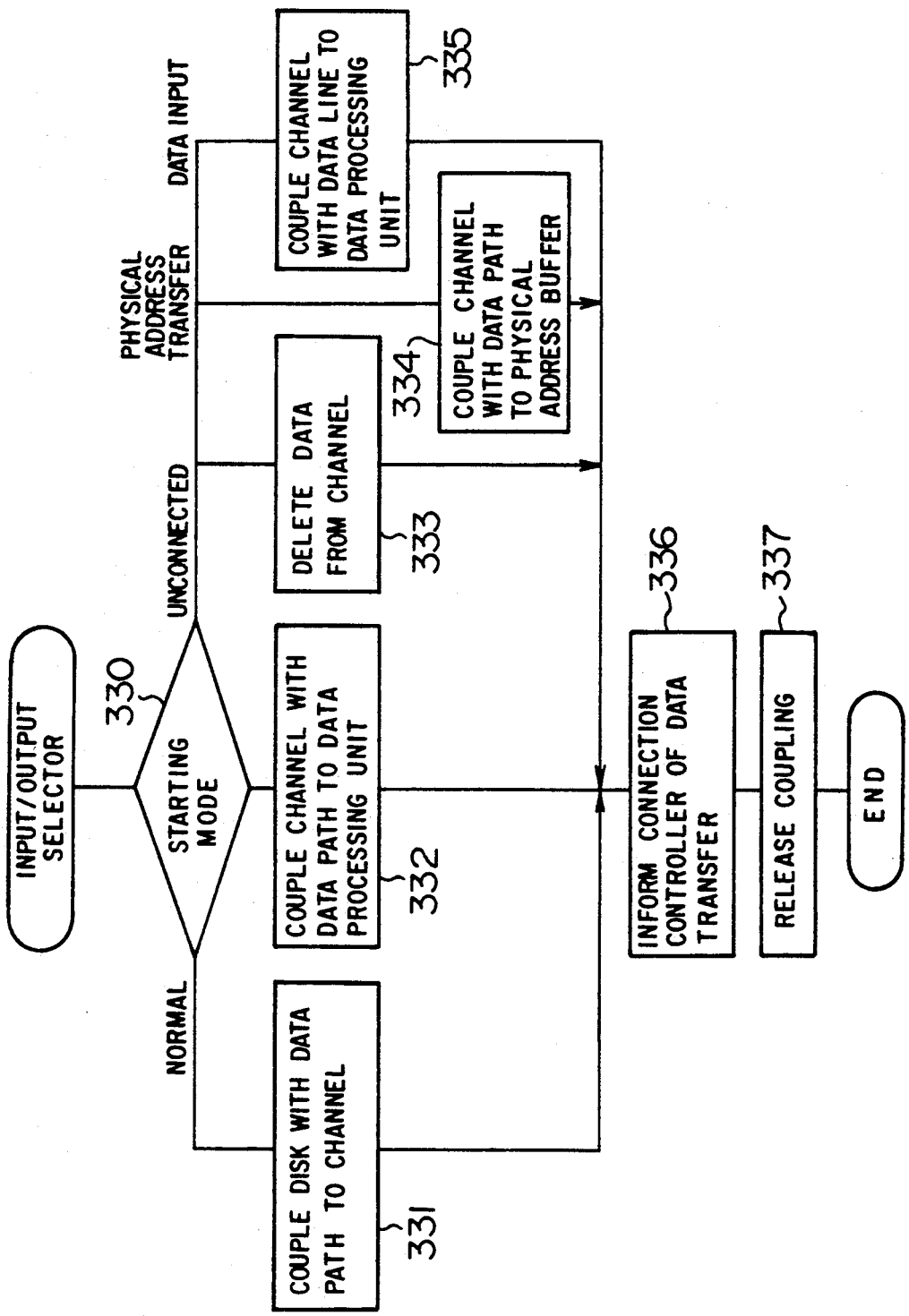
FIG. 9 is a flowchart showing processing of an input/output selector.
Figure 10:
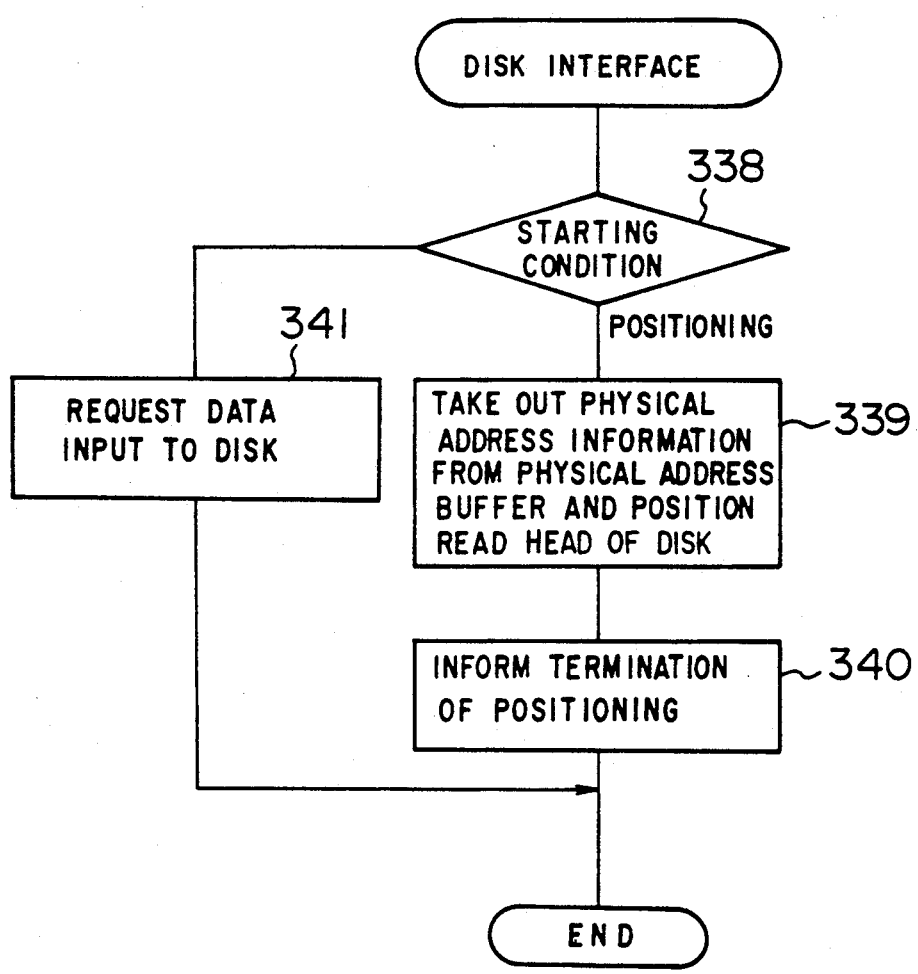
FIG. 10 is a flowchart showing processing of a disk interface.

FIG. 9 is a flowchart showing the operation of the input/output selector 2d disposed in the control unit 2, and FIG. 10 the operation of the disk interface 2g.

The input/output selector 2d transfers data from the channel 1 to the data processing unit 3 (step 332) if in the search condition information transfer mode (step 330), and abandons the search condition information 11b from the channel 1 (step 333) if in the unconnected mode. Then, after informing the connection controller 2f of a data transfer (step 336), the connection is released (step 337). By the above-mentioned operation, if the data processing unit 3 is connected to the control unit 2, the search condition information is transferred to the condition buffer 3c, whereas if it is not connected, the search condition information is abandoned at the input/output selector 2d.

Turning back to FIG. 6, the physical address transfer command 10b, which is the next channel command word, is generated to transfer the physical address information 13, so that the channel interface 2c, upon receiving this command (step 301), starts the connection controller 2f and the disk interface 2g in a physical address transfer mode, as shown in FIG. 7 (steps 304, 305).

The connection controller 2f starts the input/output selector 2d in the physical address transfer mode and transfers the physical address information to the physical address buffer 2e, as shown in FIG. 8 (steps 313, 322). The input/output selector 2d couples the channel 1 with a data path to the physical address buffer 2e (steps 330, 334) and informs the connection controller 2f of a data transfer (step 336), as shown in FIG. 9.

When a transfer of the physical address information has been completed, the disk interface 2g issues a data transfer request to the disk 4 (step 339) with reference to the physical address buffer 2e, positions a read head of the disk (step 339), and informs that the positioning has been terminated (step 340), as shown in FIG. 10.

Turning back again to FIG. 6, the data input command 10c is transferred from the channel 1 to the channel interface 2c of the control unit 2. The channel interface 2c, when receiving the page input command 10c, which is the next channel command word (step 301), once releases the coupling with the channel (step 306) and waits for an inform of positioning termination from the disk 4 (step 307), as shown in FIG. 7. Then, the channel interface 2c, when receiving the inform of positioning termination from the disk 4, starts the connection controller 2f (step 308), waits for the connection controller 2f to complete its operation (step 309), couples again the channel 1 (step 310), and transfers data (step 311). By performing this operation, the disk interface 2g is coupled again to the channel 1 and informs the channel interface of the completion of positioning (steps 338, 341), as shown in FIG. 10. In this event, if the data processing unit 3 is not connected to the control unit 2, the connection controller 2f starts the input/output selector 2d in a normal mode (step 324). On the contrary, if the data processing unit 3 is connected to the control unit 2, the connection controller 2f starts the control unit interface 3f and the input/output selector 2d in a data input mode (steps 326, 327), receives an inform of page edit completion from the data processing unit 3 (step 328), and informs the channel interface 2c of the page edit completion (steps 325, 329). Thus, if the data processing unit 3 is connected, the page is once delivered to the data processing unit 3 for edit and then transferred to the channel 1, whereas, if the data processing unit 3 is not connected, the page is directly transferred from the disk 4 to the channel 1.

Also, if the data processing unit 3 is connected in course of executing a channel command word chain, the connection controller 2f stores a connecting state of the data processing unit 3 when it receives a search condition transfer command 10a, and inhibits a page from being transferred to the data processing unit 3 until the channel command word chain is terminated. On the contrary, when the data processing unit 3 is to be disconnected, the connection controller 2f recognizes a disconnect request and inhibits a page from being transferred to the data processing unit 3 after receiving the disconnect command even if the data processing unit 3 is connected to the control unit 2. If the connection controller 2f receives a request for disconnecting the data processing unit 3 in course of executing a channel command word chain, it outputs a message for delaying the disconnection until the execution of the channel command word chain is terminated. It is thought that the disconnection request is transmitted from a console through the host computer 5 to the connection controller 2f of the control unit 2 and the data processing unit 3 is disconnected by means of a switch arranged on the frame of the control unit 2, or the disconnection request is transmitted from the control unit interface 3f to the connection controller 2f and the data processing unit 3 is disconnected by means of a switch arranged on the frame of the data processing unit 3. Either of these methods may be employed. Thus, the data processing unit 3 can be connected to and disconnected from the control unit 2 at any time.

Next, a second embodiment of the present invention will be explained.

Figure 11:
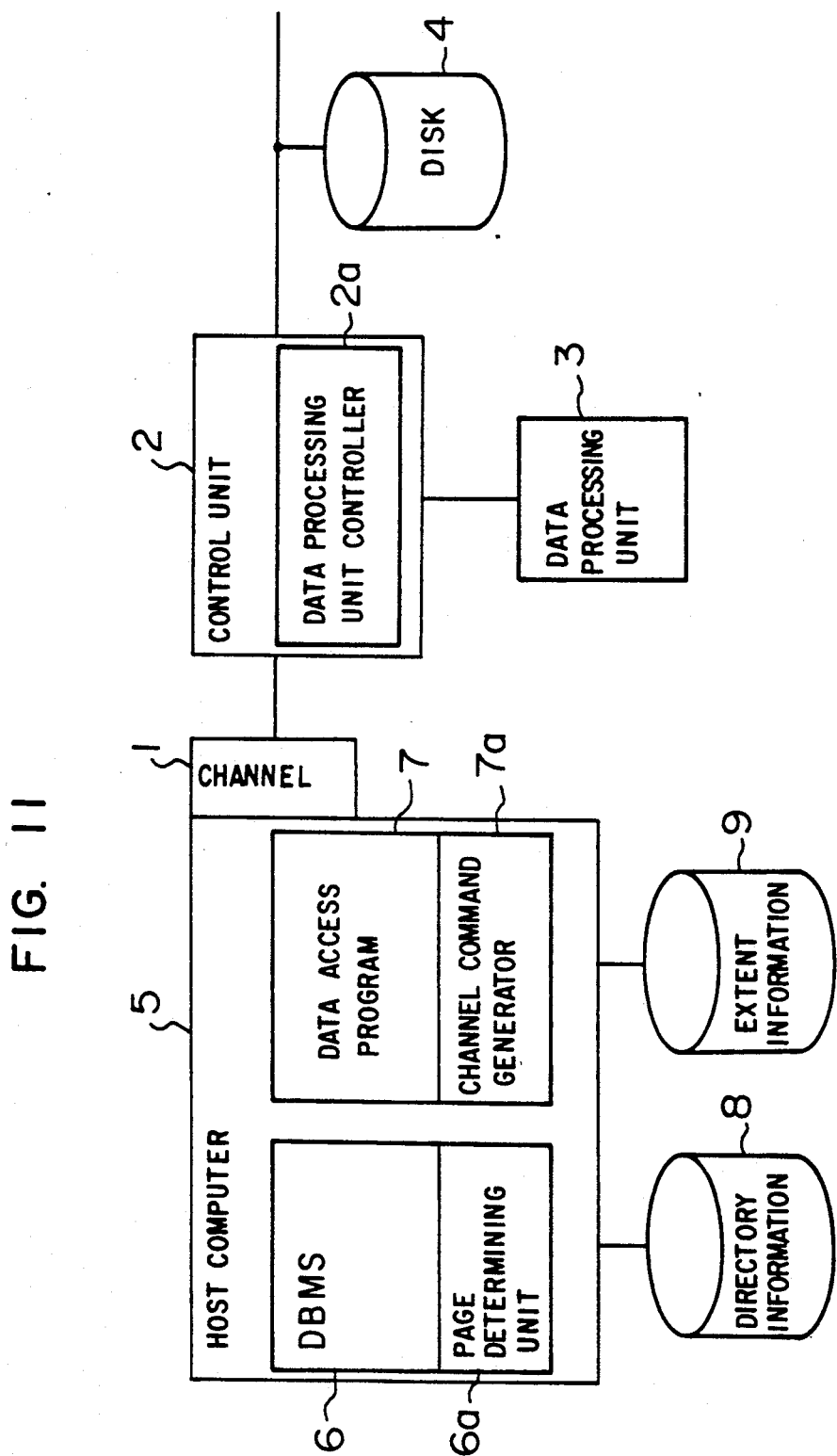
FIG. 11 is a functional block diagram of a data processing system according to a second embodiment of the present invention.

FIG. 11 is a block diagram showing a general configuration of a data processing system according to the second embodiment of the invention.

In the second embodiment, the processing of a host computer 5 and a DBMS 6 will be described.

Here, the DBMS (database management system) 6 is exemplified as a program which issues a data operation request to a data processing unit 3.

In FIG. 11, reference numeral 5 designates the host computer (central processing unit), 1 a channel disposed on the host computer side for performing input/output control, 7 a data access program, 3 the data processing unit, 4 a disk for storing a database, 2 a control unit for controlling the disk 4 to input and output data to and from the disk 4, 8 a directory information file provided for the DBMS 6 to manage the database, and 9 an extent information file provided for the data access program to manage pages stored in the disk 4. The DBMS 6 is also provided with a page determining unit 6a, the data access program 7 with a channel command generator 7a, and the control unit 2 with a data processing unit controller 2a.

Figure 12:
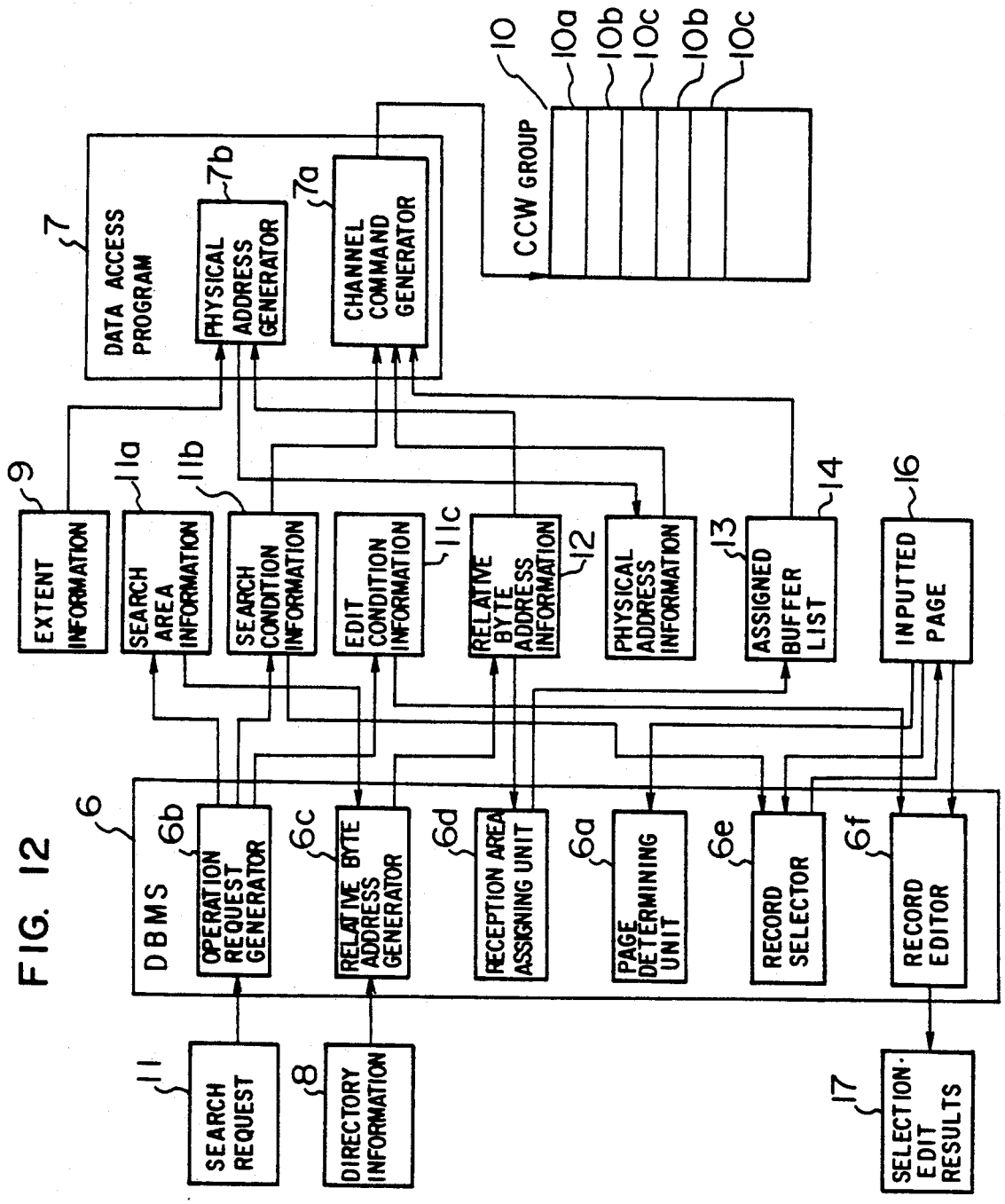
FIG. 12 is a functional block diagram of a DBMS and a data access program used in the system shown in FIG. 11.
Figure 13:
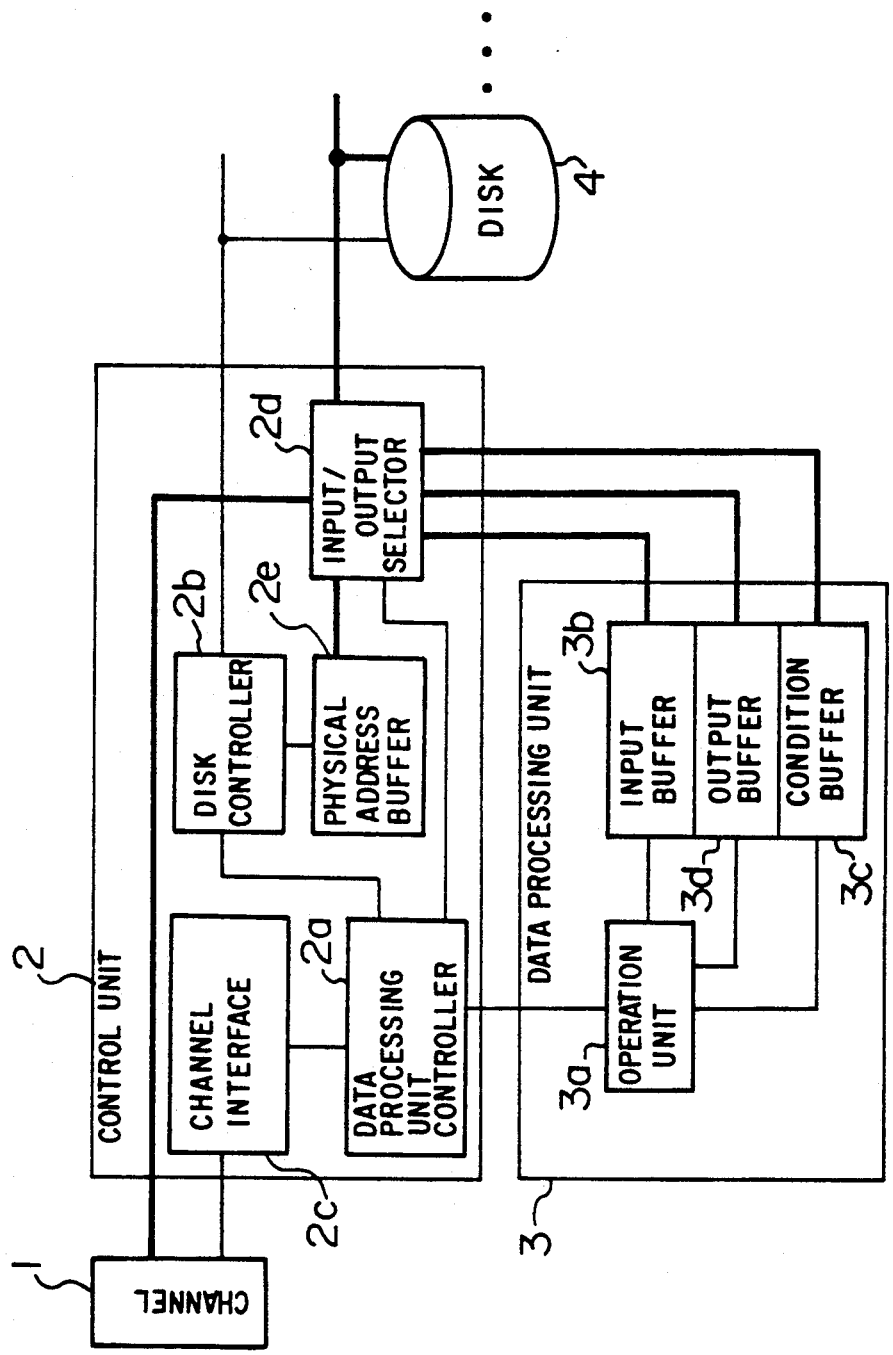
FIG. 13 is a functional block diagram of a control unit and a data processing unit used in the system shown in FIG. 11.

FIG. 12 is a functional block diagram of the DBMS and the data access program, and FIG. 13 is a block diagram showing the configurations and functions of the control unit and the data processing unit.

As shown in FIG. 12, the DBMS 6 is provided with an operation request generator 6b, a relative byte address generator 6c, a reception area assigning unit 6d, a record selector 6e and a record editor 6f, in addition to the above-mentioned elements. The data access program 7 in turn is provided with a physical address generator 7b, in addition to the above-mentioned elements.

The control unit 2, as shown in FIG. 13, is provided with a disk controller 2b, a channel interface 2c, an input/output selector 2d, and a physical address buffer 2e, in addition to the element mentioned above.

The data processing unit 3 is provided with an operation unit 3a, an input buffer 3b, an output buffer 3d and a condition buffer 3c.

An outline of the processing performed by the data processing unit 3 will be described with reference to FIG. 12. Upon receiving a search request 11 from the user, the operation request generator 6b of the DBMS 6 analyzes the search request 11 and as the results obtains search area information 11a describing which page is to be searched, search condition information describing which data is to be selected in the page, and edit condition information 11c describing in which form searched data is to be edited. The relative byte address generator 6c converts the search area information 11a to a list 12 of relative byte address which represents relative byte addresses expressed by logical addresses in a list form and indicates in which area of the disk is to be searched, with reference to directory information 8 describing the relationship between a relative address serving as an identifier of a page and a physical address on the disk 4. The reception area assigning unit 6d receives the list 12 of relative byte address generated by the relative byte address generator 6c, determines the number of reception areas to maintain necessary areas, and generates an assigned buffer list 14 for releasing unused areas after a data transfer has been completed. The page determining unit 6a determines, after a data transfer has been completed, determines from a transferred page whether or not the data processing unit 3 has operated. If it is determined that the data processing unit 3 has not operated, the record selector 6e and the record editor 6f are called to perform selection and edit. On the contrary, if it is determined that the data processing unit 3 has operated, the record editor 6f only is called.

FIG. 14 illustrates how a database is stored in the disk 4 shown in FIG. 13.

In the present embodiment, an SQL (Structured Query Language) is used as a search request 11. The SQL is a language which is specified as described in "An Introduction to Database Systems", C. J. Date, Vol. 1, Fourth Edition. FIG. 14 shows how the database is stored in the disk and how the database is processed by the SQL. A database is composed of a plurality of pages 41, each page 41 is composed of a plurality of records 41a, and each record 41a is composed of a plurality of columns 41b.

The search request 11 of this embodiment shows a case where all records in a table T1 are read from the disk records which include the value "F" (female) in third column C3 (SEX) are selected (based on the search condition), and the second (NAME), fourth (AGE) and sixth (SECTION) columns of the selected records are edited (based on the edit condition) and outputted.

Turning back to FIG. 12, the physical address generator 7b of the data access program 7 converts the list 12 of relative byte address from the DBMS 6 to physical address information 13 referring to extent information 9 describing mapping information between the relative byte addresses and the physical addresses. The channel command generator 7a generates from the search condition information 11b produced by the DBMS 6, the assigned buffer list 14 and the physical address information 13 generated by the physical address generator 7b a command (channel command word) which is to be transferred to the data processing unit 3.

In FIG. 13, the channel interface 2c of the control unit 2 starts the data processing unit controller 2a by a control signal generated from the channel 1 and returns the control to the channel 1 by an inform of termination from the data processing unit controller 2a. The data processing unit controller 2a in turn starts the disk controller 2b, the input/output selector 2d, and the operation unit 3a of the data processing unit 3 by a starting signal generated from the channel interface 2c to perform the control of the data processing unit 3.

The disk controller 2b controls the disk 4 by a starting signal generated from the data processing unit controller 2a. The input/output selector 2d selects a data path by a starting signal generated from the data processing unit controller 2a.

The operation unit 3a of the data processing unit 3, by a starting signal generated from the data processing signal controller 2a, processes data transferred to the input buffer 3b with reference to the condition buffer 3c and transfers the thus processed data to the output buffer 3d.

Figure 16:
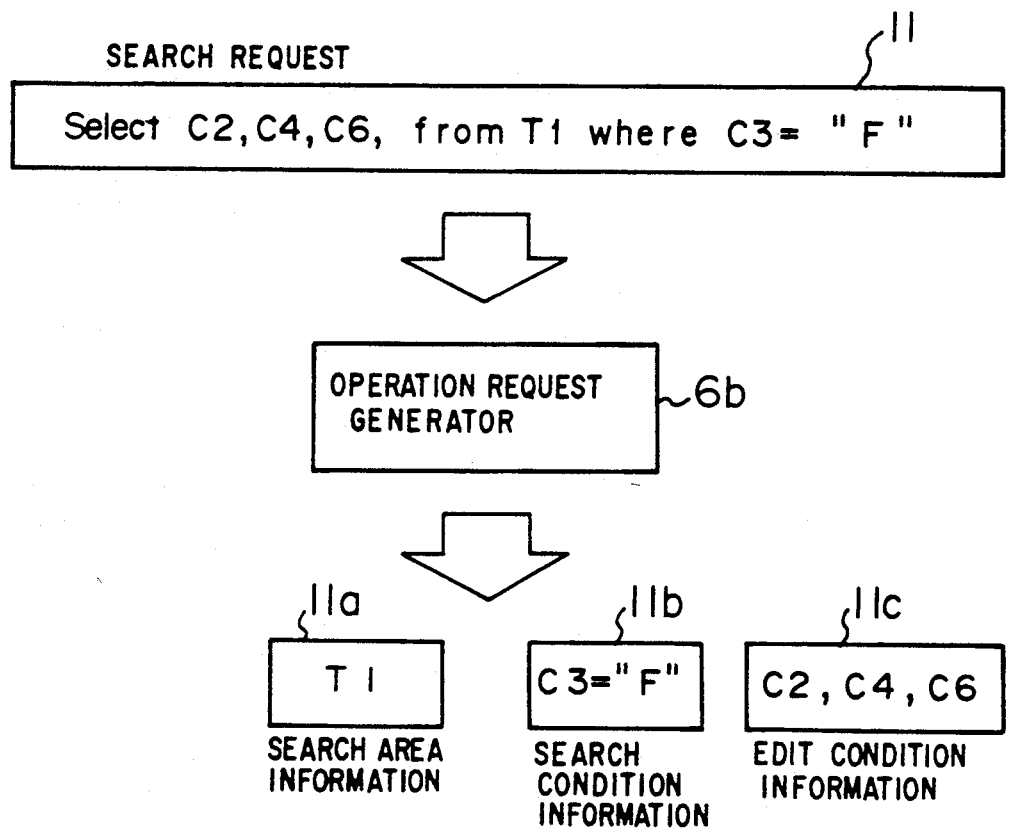
FIG. 16 is a diagram roughly showing the operation of an operation request generator.
Figure 17:
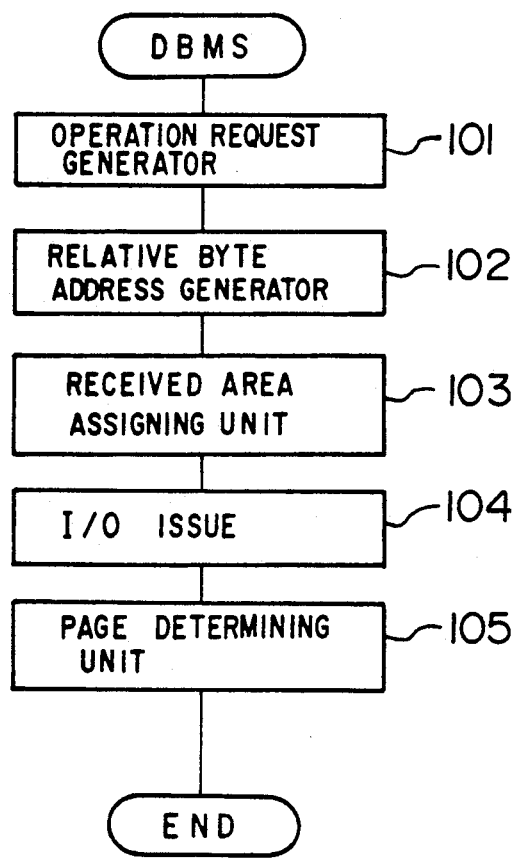
FIG. 17 is a flowchart showing the basic operation of the DBMS.
Figure 18:
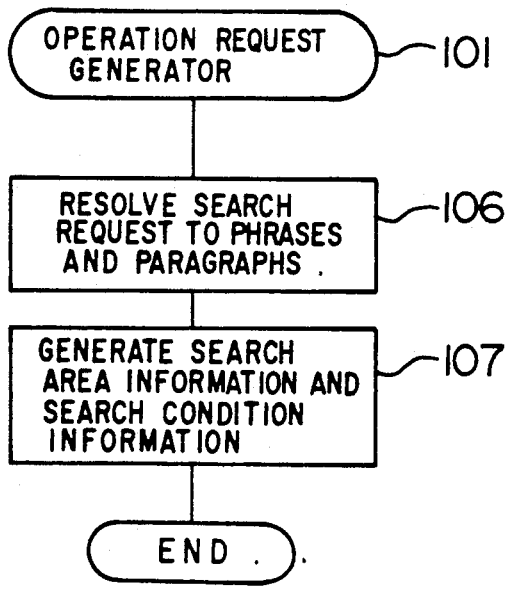
FIG. 18 is a flowchart showing the processing of the operation request generator.

FIG. 16 illustrates an outline of the processing performed by the operation request generator 6b of FIG. 12, and FIGS. 17 and 18 are flowcharts of processing performed by the DBMS and the operation request generator, respectively.

As shown in FIG. 16, upon receiving a search request 11 from the user, the operation request generator 6b of the DBMS 6 converts the received search request 11 to the search area information 11a, the search condition information 11b and the edit condition information 11c.

In the example shown in FIG. 16, it is assumed that the search request 11 has been issued to search a table T1, select records in which "F" is written in the third column C3 thereof, and edit the second, fourth and sixth columns C2, C4 and C6 from these searched records. Then, a formula C3='F' is produced as the search area information 11b while C2, C4 and C6 are produced as the edit condition information 11c.

This operation is shown in FIG. 17 as the processing performed by the operation request generator at step 101 and corresponds to processing at step 106 for resolving a search request into phrases and paragraphs and processing at step 107 for generating search area information and search condition information, both performed by the operation request generator as shown in FIG. 18.

Next, the DBMS 6 transfers the control to the relative byte address generator 6c for converting the search area information 11a generated by the operation request generator 6b to the list 12 of relative byte address. The relative byte address generator 6c refers to the directory information 8, generated when the DBMS 6 produces a database, for managing mapping information between a table and a logical address to convert the search area information 11a to the list 12 of relative byte address.

Figure 19:
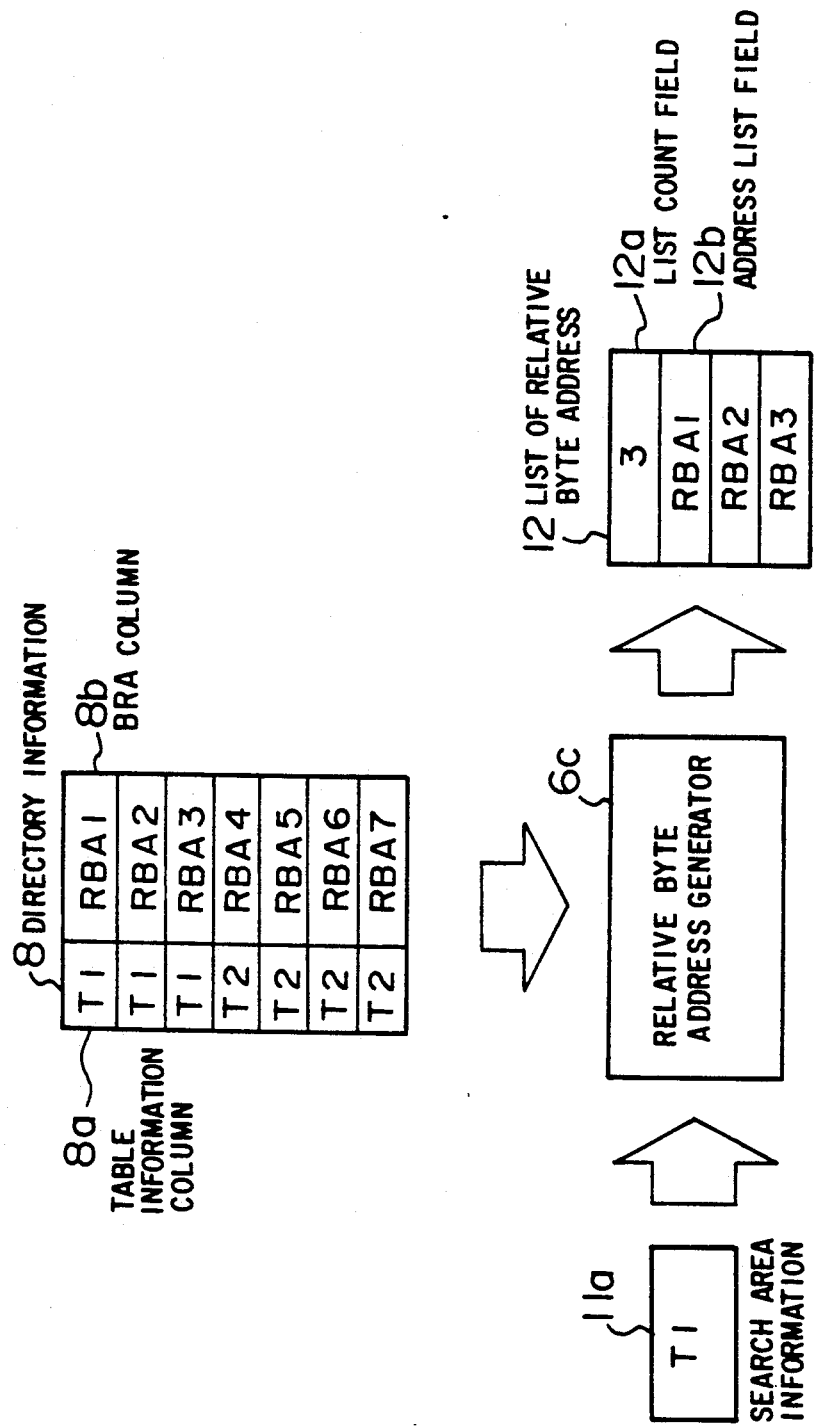
FIG. 19 is a diagram roughly showing the operation of a relative byte address generator.

FIG. 19 illustrates an outline of the processing performed by the relative byte address generator 6c shown in FIG. 12.

It is assumed in this embodiment that each address in the list 12 of relative byte address is given by RBA (Relative Byte Address) which represents a relative position from the first record of data, and tables T1 and T2 have been produced on the database.

When the table T1 is inputted as the search area information 11a, RBA1, RBA2 and RBA3 are extracted to an address list field 12b in the list 12 of relative byte address, and the number of addresses in the list or "3" in this case is inputted to a list count field 12a. This operation is shown in FIG. 17 as the processing performed by the relative byte address generator at step 102 which corresponds to processing at steps 108 to 113 in FIG. 20.

More specifically, the relative byte address generator, started at step 102, inputs the search area information (step 108) and searches the directory information (step 109) to determine whether or not the directory information has been completely examined (step 110). If it is determined that the directory information has been examined, the processing is terminated. If the table information column is coincident with the table name (step 111), the RBA written in the RBA column is registered in the list of relative byte address (step 112), and the next table information column is examined (step 113).

Figure 22:
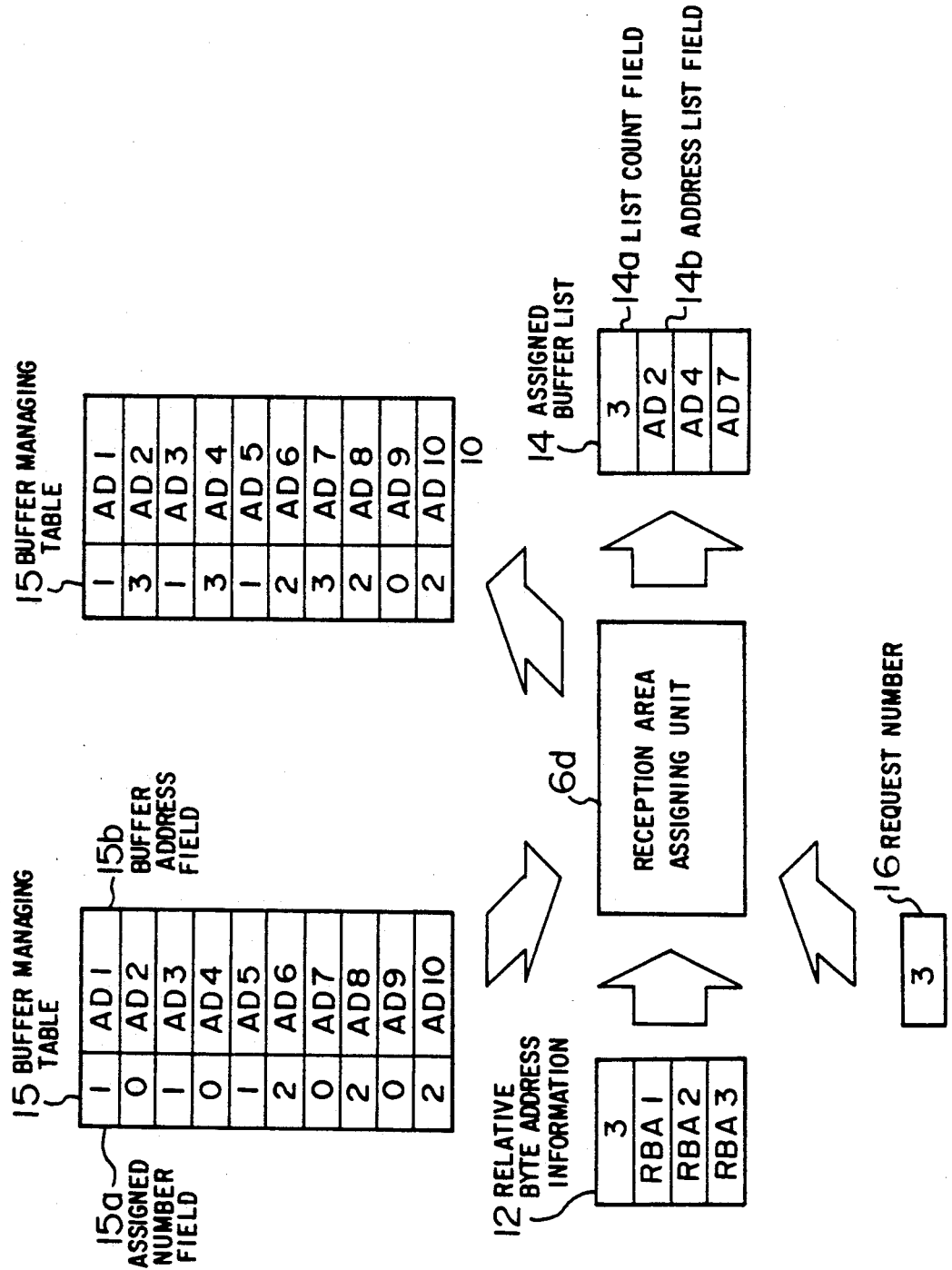
FIG. 22 is a diagram roughly showing the operation of the reception area assigning unit.

FIG. 22 illustrates an outline of the processing performed by the reception area assigning unit shown in FIG. 12.

The DBMS 6 transfers the control to the reception area assigning unit 6d for assigning a reception area necessary for executing a search request. The reception area assigning unit 6d first sets the number of assigned buffers to the same number as that of addresses registered in the list 12 of relative byte address by referring to the list count field 12a (see FIG. 19) of the list 12 of relative byte address. Next, a request number 16 is designated which is unique in the DBMS as an identifier of the search request 11. Then, referring to a buffer manage table 15, a number of buffers, determined by unassigned buffers, are reserved, and the addresses of the reserved buffers are extracted to the assigned buffer list 14.

In FIG. 22, there are prepared ten buffers, wherein the first, third and fifth buffers have been assigned to the request number 1 while the sixth, eighth and tenth buffers have been assigned to the request number 2, and the request number 3 is requesting three buffers. As a result, by searching the buffer manage table 15 from the top as shown in FIG. 22, unassigned second, fourth and seventh buffers are assigned to the request number 3, buffer addresses AD2, AD4 and AD7 are stored in the address list field 14b of the assigned buffer list 14, and the number of assigned buffers is stored in the list count field 14a.

Figure 21:
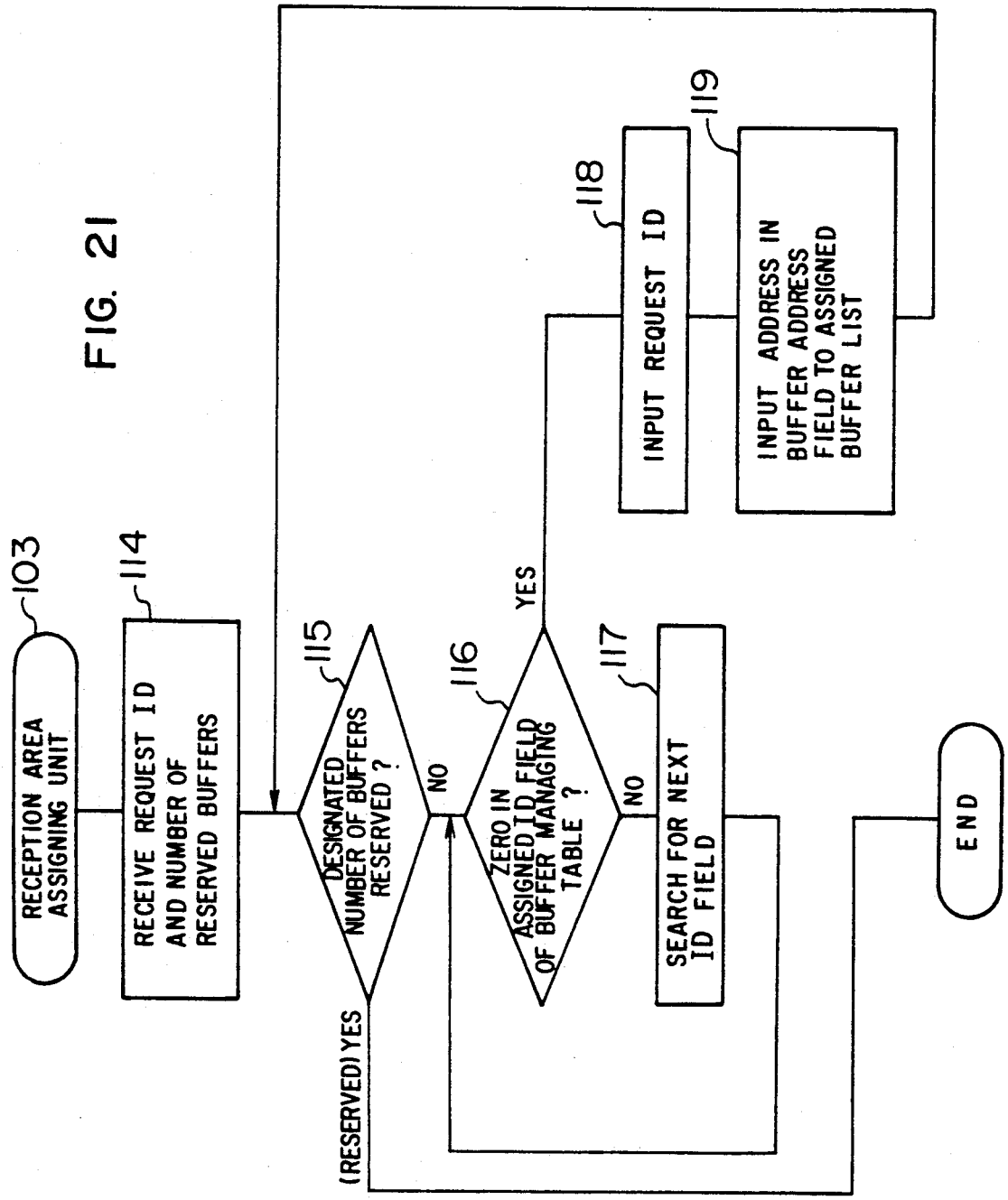
FIG. 21 is a flowchart showing the processing of a reception area assigning unit.

The above-mentioned operation corresponds to the processing at steps 114 to 119 performed by the reception area assigning unit started at step 103 in FIG. 21. More specifically, in FIG. 21, the reception area assigning unit receives the reserved number of buffers for storing the request IDs 16 (step 114), determines whether or not the designated number of buffers have been reserved (step 115), and further determines whether or not an assigned ID field in the buffer manage table is zero (step 116) if it is determined at step 115 that the designated number of buffers have not been reserved. If zero is stored the assigned ID field in the buffer manage table, the request ID is stored therein (step 118), and then the address in the buffer address field is written into the assigned buffer list 14. On the contrary, if the assigned ID field contains a number other than zero (step 116), the next ID is searched (step 117).

The DBMS 6 thereafter issues a search request to the data access program 7, which is processing shown in FIG. 17 as "issue of I/O" at step 104.

The data access program 7, upon receiving the search request from the DBMS 6, transfers the control to the physical address generator 7b.

Figure 4:
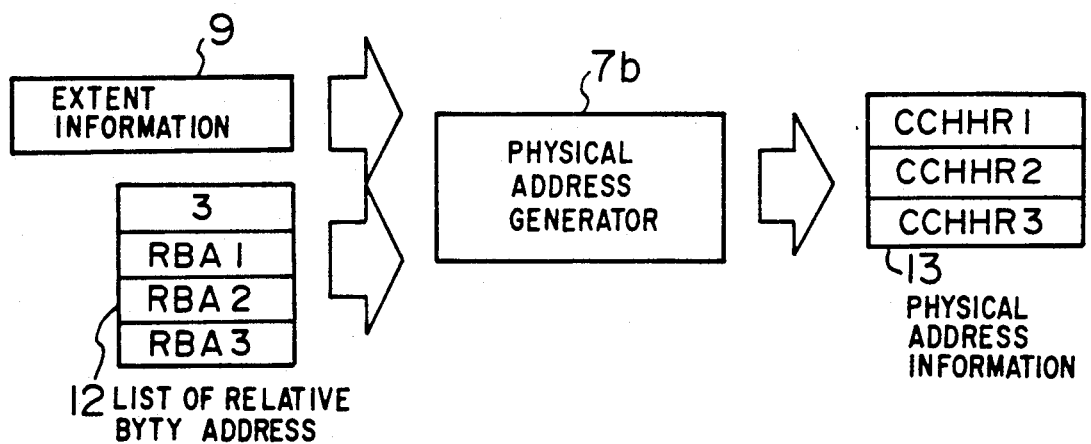
FIG. 4 is a diagram roughly showing an operation of a physical address generator.

FIG. 4 illustrates an outline of the processing performed by the physical address generator 7b shown in FIG. 12.

The physical address generator 7b converts the list 12 of relative byte address generated by the DBMS 6 to physical address information 13 where each relative byte address in the list 12 is converted to a corresponding physical address on the basis of the extent information 9.

In the example shown in FIG. 4, it is assumed that three RBA1, RBA2 and RBA3 are inputted as relative byte addresses stored in the list 12, and physical addresses corresponding to these relative byte addresses CCHHR1, CCHHR2 and CCHHR3 are generated.

Figure 23:
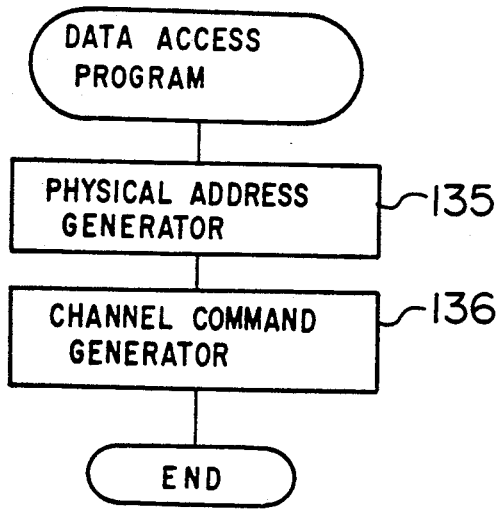
FIG. 23 is a flowchart showing the processing of a data access program.
Figure 24:
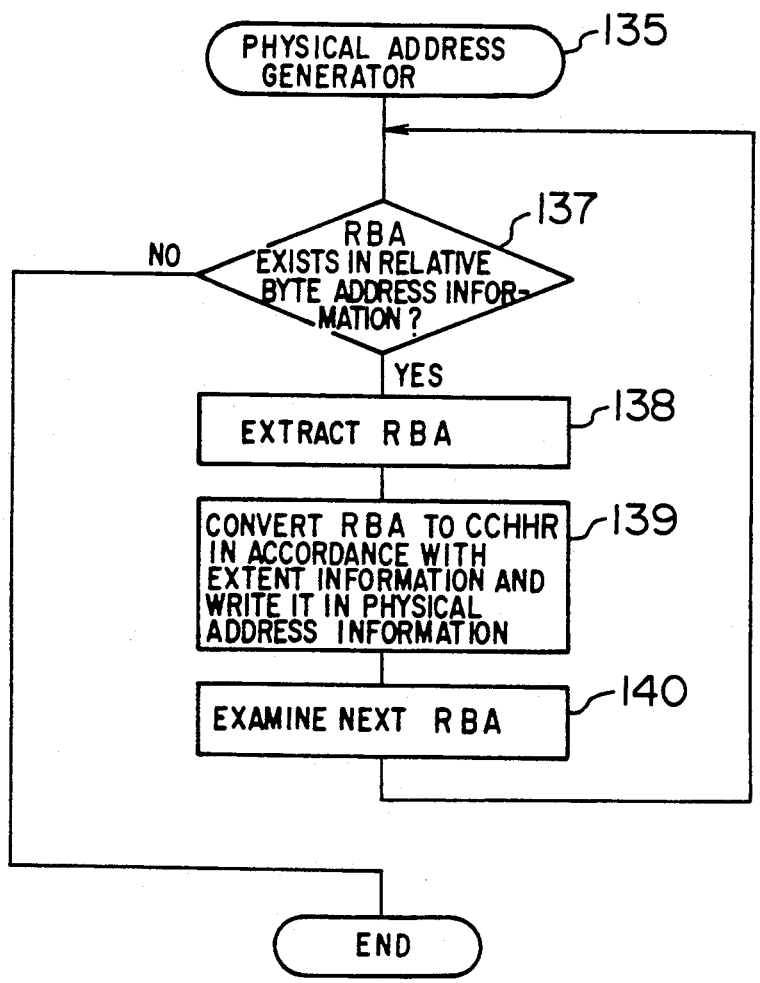
FIG. 24 is a flowchart showing the processing of the physical address generator.

FIG. 23 illustrates a processing flow of the data access program, and FIG. 24 that of the physical address generator.

In FIG. 23, the data access program, after completing the processing of the physical address generator (step 135), executes the processing of the channel command generator 136. Here, the step 135 relates to the physical address generation processing.

In FIG. 24, it is determined whether or not the RBA still exists in the list 12 of relative byte address (step 137). If the RBA exists, it is extracted (step 130). Then, the next RBA is examined (step 140).

The data access program 7 next transfers the control to the channel command generator 7a which generates a data operation request command group for starting the control unit 2 (step 136), as shown in FIG. 23.

Figure 25:
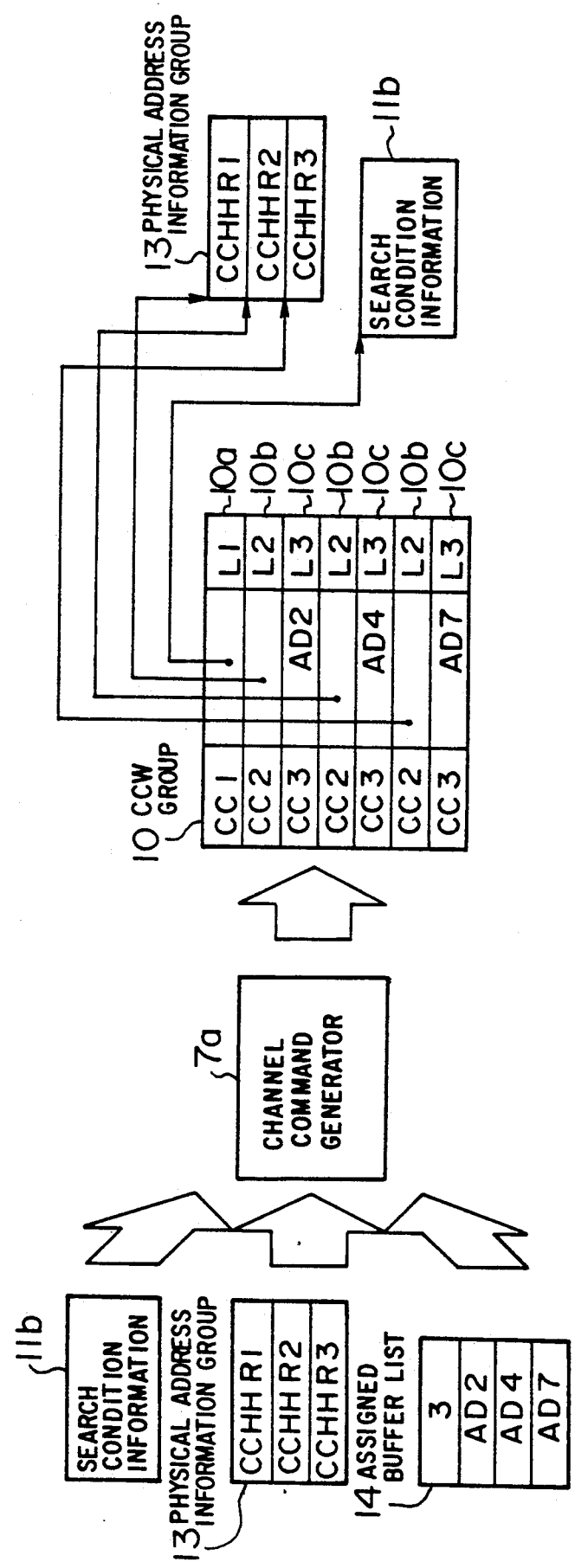
FIG. 25 is a diagram roughly showing the operation of a channel command generator.

FIG. 25 illustrates an outline of the processing performed by the channel command generator 7a shown in FIG. 12.

The channel command generator 7a receives the physical address information 13 generated by the physical address generator 7b, the search condition information 11b received from the DBMS 6 and the assigned buffer list 14 to produce a group of data operation request commands.

In the example shown in FIG. 25, it is assumed that the channel command generator 7b receives all of the physical address information 13, the search condition information 11b and the assigned buffer list 14, where three buffers are assigned as shown in FIG. 22 and AD2, AD4 and AD7 are stored in the assigned buffer list 14 as the addresses of the assigned buffers.

Figure 26:
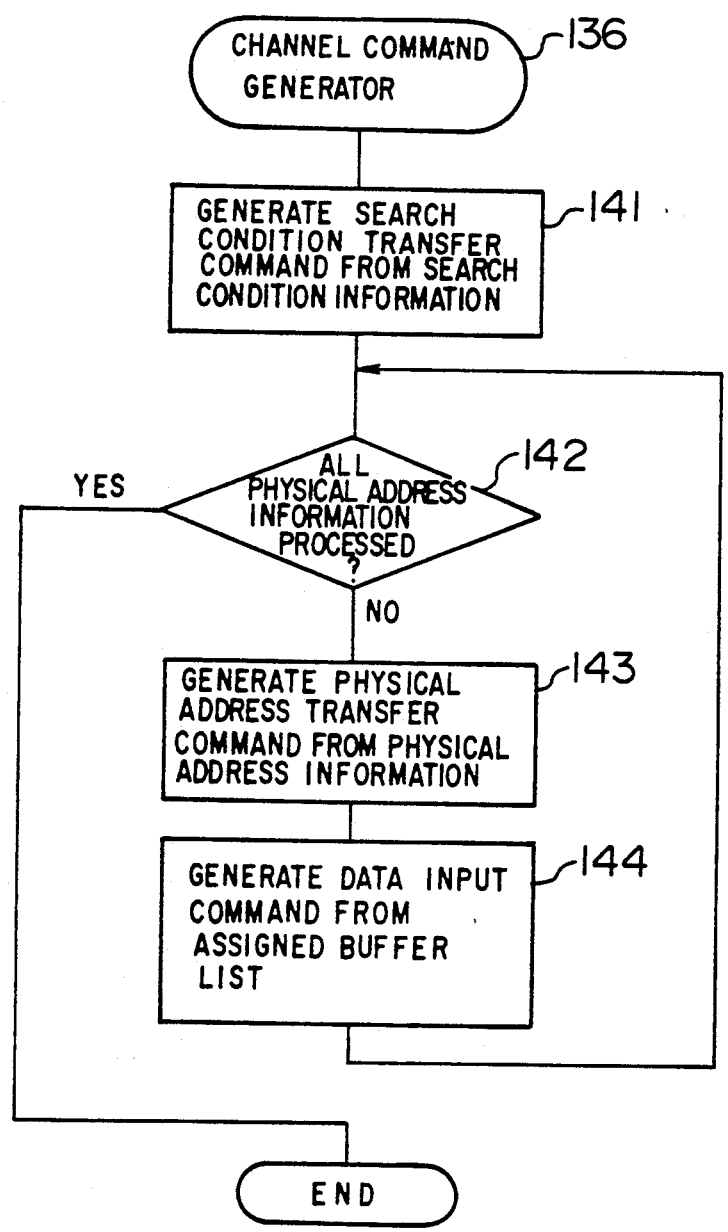
FIG. 26 is a flowchart showing the processing of the channel command generator.

FIG. 26 is a flowchart of the processing performed by the channel command generator.

The processing of the channel command generator shown as the step 136 in FIG. 23 is composed of, as shown in FIG. 26, generating a search condition transfer command from the search condition information (step 141), determining whether or not all the physical address information has been processed (step 142), and generating the physical address transfer command from the physical address information if all the physical address information has not been processed (step 144). If all the physical address information has been processed, the processing is terminated.

As the data operation request command, the channel command word (CCW) is employed in this embodiment. As described above, FIG. 5 shows the data format of the channel command word 10 which is composed of the command code 10d, the data address field 10e and the count field 10f.

Next, explanation will be given of the collective operations of the channel 1, the control unit 2, the data processing unit 3 and the disk 4.

First, the interface between the channel 1 and the control unit 2 will be described in detail. The channel 1, upon receiving a channel command word group from the data access program, transfers the unit address 12 to the control unit 2 as a starting signal.

Figure 29:
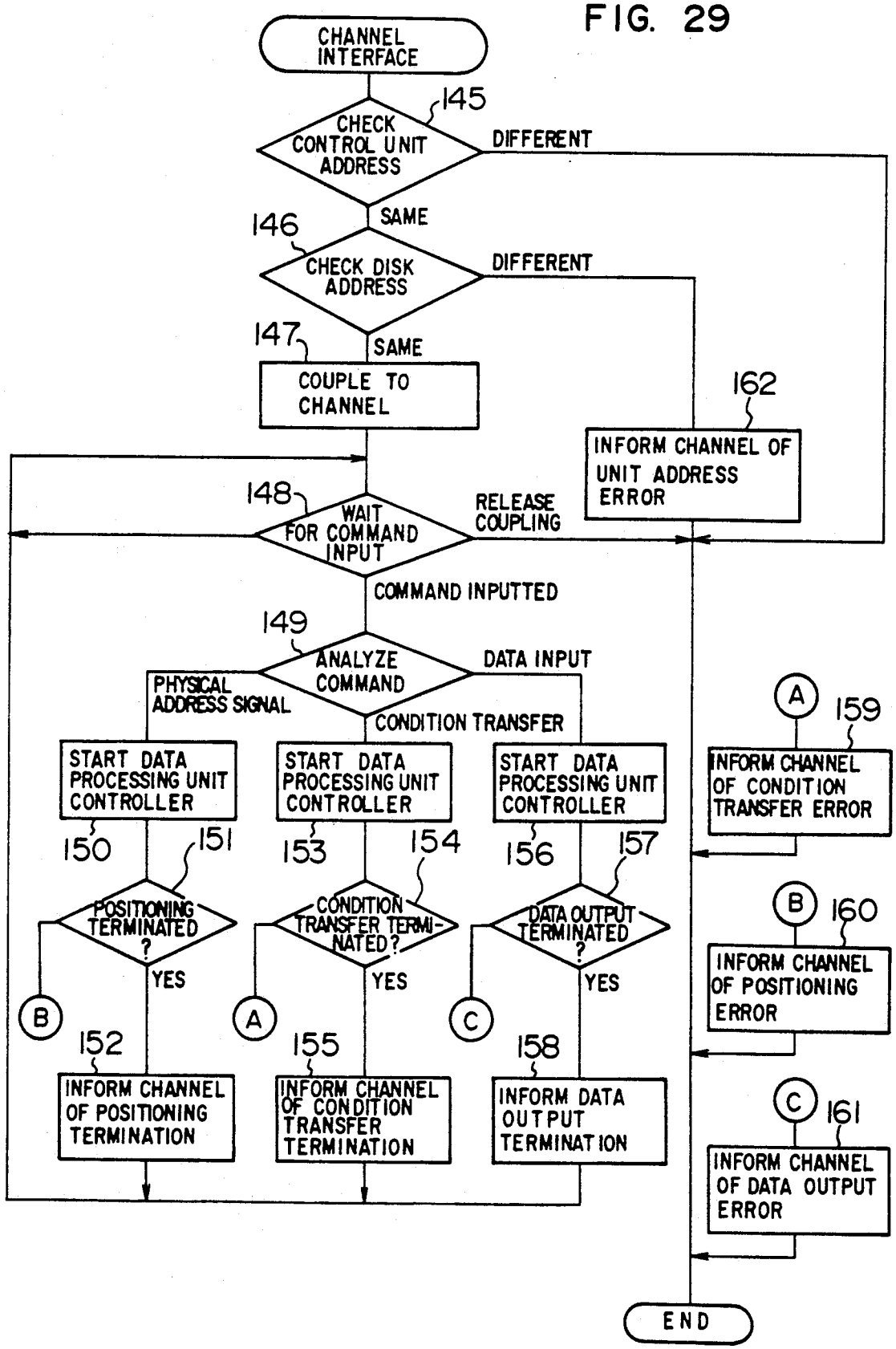
FIG. 29 is a flowchart showing the processing of the channel interface.
Figure 30:
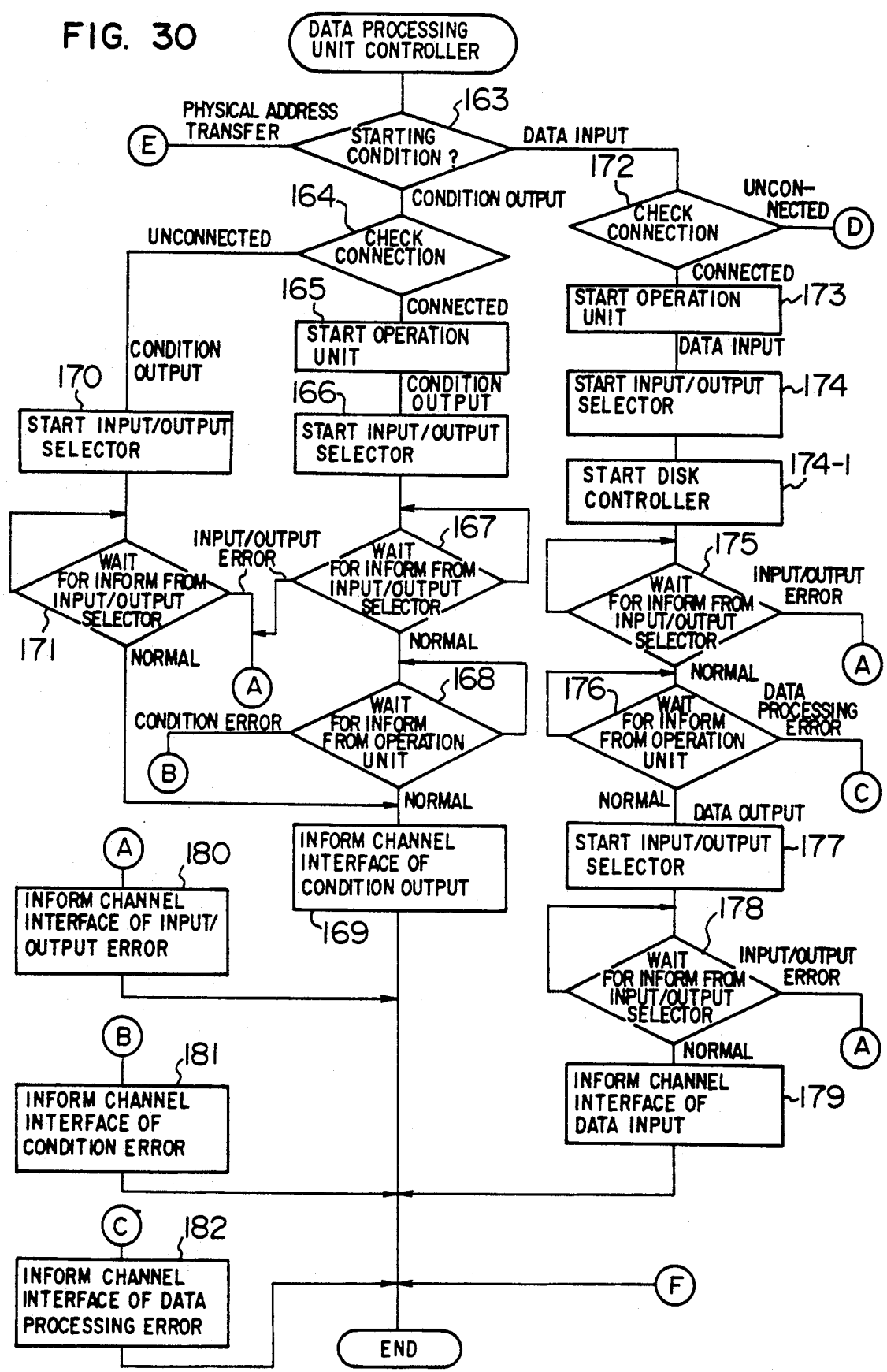
FIG. 30 and FIGS. 31A and 31B are flowcharts showing the processing of a data control unit controller.
Figure 31A:
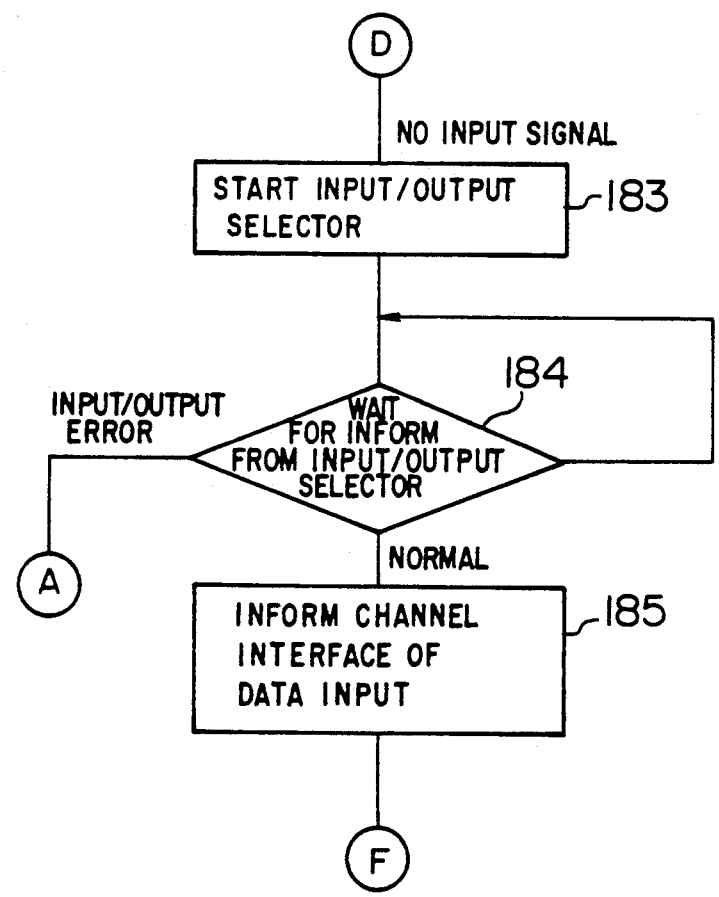
Figure 31B:
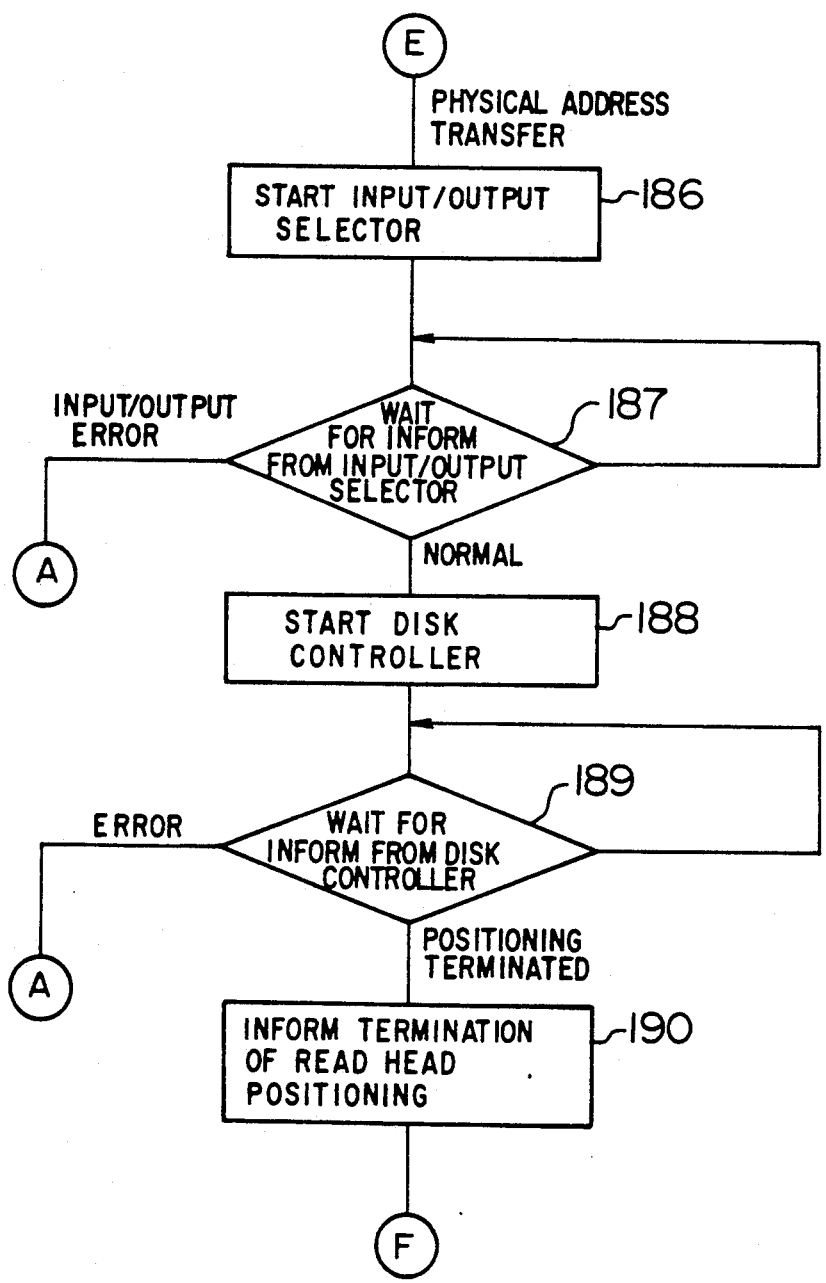
Figure 32:
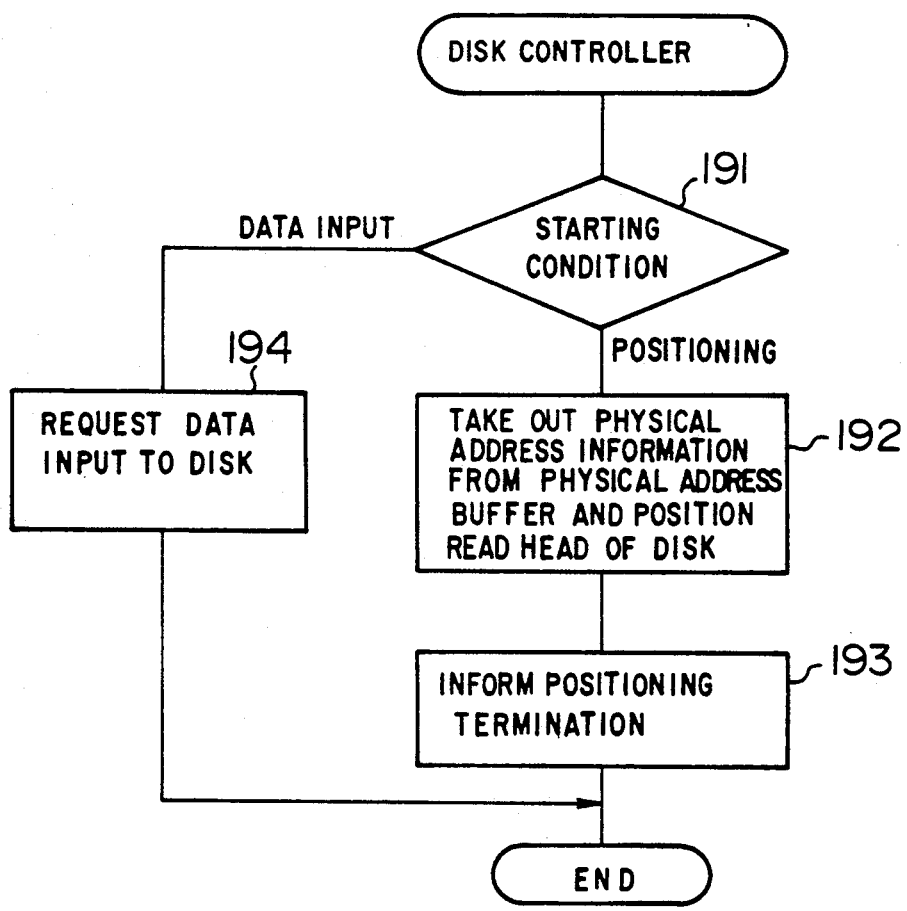
FIG. 32 is a flowchart showing the processing of a disk controller.

FIG. 27 is a format of the unit address 12; FIG. 28 a table showing the relationship between signals inputted to the input/output selector and movement and type of data; FIG. 29 is a flowchart of the operation performed by the channel interface; FIGS. 30, 31A and 31B flowcharts of the operation performed by the data processing unit controller; FIG. 32 a flowchart of the operation performed by the disk controller; and FIG. 33 a flowchart of the operation performed by the input/output selector.

The unit address 12, as shown in FIG. 27, is composed of a control unit address 12a and an address 12b of a disk which records data to be extracted.

Control unit 2 first checks the control unit address 12a (step 145 shown in FIG. 29), further checks the disk address 12b (step 146), and is coupled to the channel 1 if both addresses are coincident (step 147). The channel 1, when coupled to the control unit 2, transfers a command code 10a as a start signal to the control unit 2.

When the channel 1 is coupled to the control unit 2 by the above procedure (step 147), the channel interface 2c is set into a command input waiting state (step 148).

The channel command word group inputted from the channel 1 is composed of a search condition transfer command 10a, a physical address transfer command 10b and a data input command 10c, and these commands are started by the channel 1 in this order.

(i) First, the channel interface 2c, when recognizing the search condition transfer command 10a (step 149 shown in FIG. 29), starts the data processing unit controller 2a in a condition transfer mode (step 153).

The data processing unit controller 2a checks the connection of the data processing unit 3 (step 164 shown in FIG. 30), and if the data processing unit 3 is connected to the control unit 2, the data processing unit controller 2a starts the operation unit 3a and the input/output selector 2d in the condition transfer mode (steps 165, 166), and waits for informs from the operating unit 3a and the input/output selector 2d (steps 167, 168).

The input/output selector 2d, on the other hand, when the search condition is transferred thereto (steps 195, 198), informs the data processing unit controller 2a of a search condition (step 197), while the operation unit 3a recognizes that the search condition has been transferred to the condition buffer 3c and informs a receipt of a search condition. This is the operation performed by the input/output selector 2d when a condition output signal is inputted, as shown in FIG. 28.

The data processing unit controller 2a receives the informs from the input/output selector 2d and the operating unit 3 (steps 16, 168 shown in FIG. 30), and informs the channel interface 2c of an output of the search condition (step 169 in FIG. 30 and steps 154, 155 in FIG. 29).

If it is detected that the data processing unit 3 is not connected to the control unit 2 (steps 163, 164 shown in FIG. 30), the data processing unit controller 2a starts the input/output selector 2d in the condition transfer mode (step 170) and waits for an inform from the input/output selector 2d (step 171).

Figure 33:
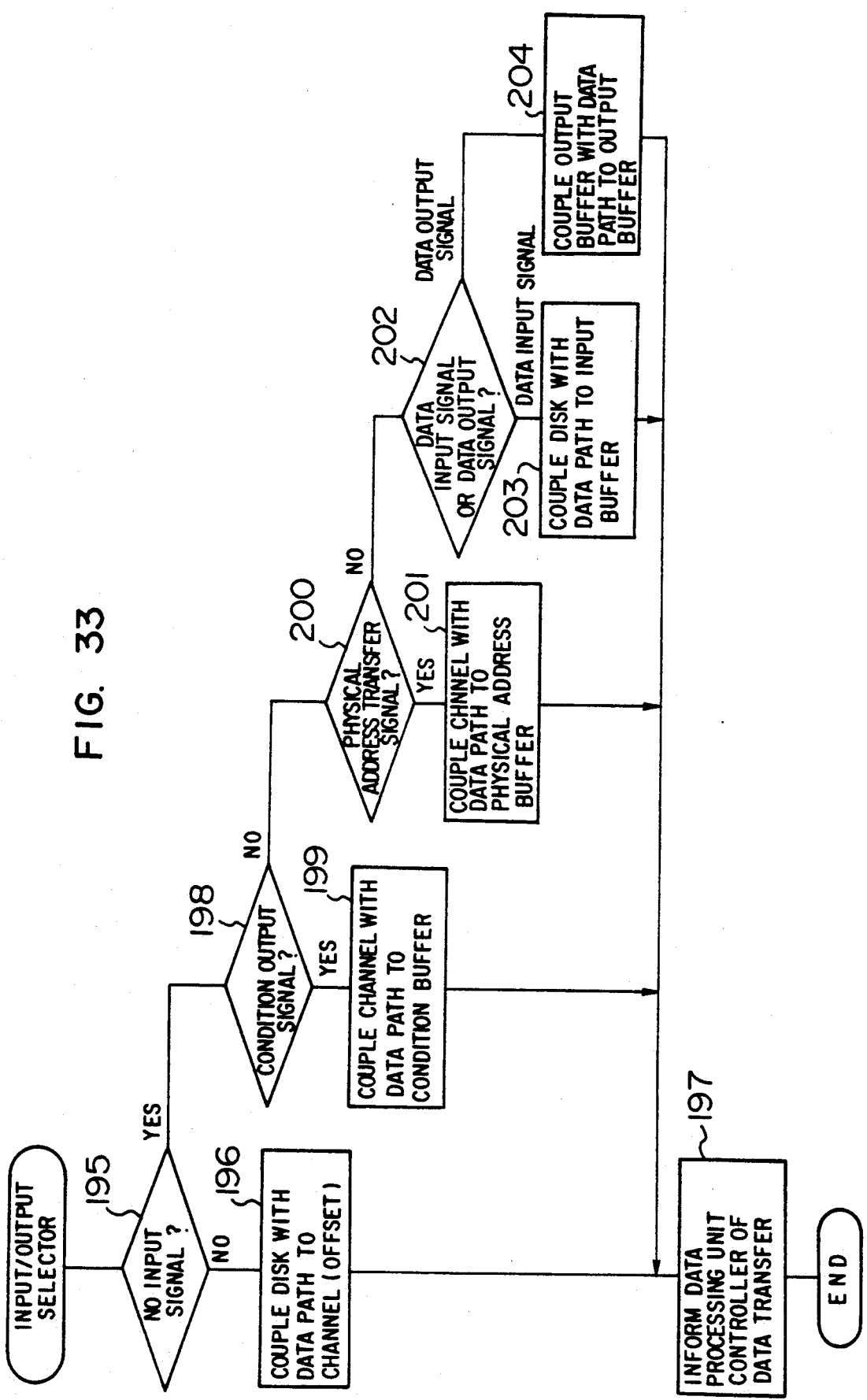
FIG. 33 is a flowchart showing the processing of an input/output selector.

The input/output selector 2d, when the search condition is transferred thereto, informs the data processing unit controller 2a of a search condition (steps 195, 198, 199, 197 shown in FIG. 33). This is the operation performed by the input/output selector 2d when the condition output signal is inputted, as shown in FIG. 28.

The data processing unit controller 2a, upon receiving the inform from the input/output selector 2d, informs the channel interface 2c of the search condition output (steps 171, 169 in FIG. 30 and steps 54, 155 in FIG. 29).

(ii) Next, the channel interface 2c, when recognizing the physical address transfer command 10b, starts the data processing unit 2a in a physical address transfer mode (steps 148, 149, 150 shown in FIG. 29).

The data processing unit controller 2a starts the input/output selector 2d in the physical address transfer mode and waits for an inform from the input/output selector 2d (step 163 in FIG. 30 and steps 186, 187 in FIG. 31).

The input/output selector 2d, when the physical address information is transferred thereto, informs the data processing unit controller 2a of a physical address information transfer (steps 195, 198, 200, 201, 197 shown in FIG. 33). This is the operation performed by the input/output selector 2d when a physical address signal is inputted, as shown in FIG. 28.

The data processing unit controller 2a, upon receiving the inform of physical address information transfer, starts the disk controller 2b (steps 187, 188 shown in FIG. 31B).

The disk controller 2b controls the disk 4 to position a read head (steps 191, 192 shown in FIG. 32), and then, when receiving an inform of read head positioning termination, informs the data processing unit controller 2a of a positioning termination (step 189).

The data processing unit controller 2a, upon receiving the inform from the disk controller 2b (step 189 in FIG. 31B), informs the channel interface 2c of the positioning termination (step 190 in FIG. 31B and steps 151, 152 in FIG. 29).

(iii) Next, the channel interface 2c, when recognizing the data input command 10c (steps 148, 149 shown in FIG. 29), starts the data processing unit controller 2a in a data input mode (step 156).

The data processing unit controller 2a checks the connection of the data processing unit 3 (steps 163, shown in FIG. 30), and if the data processing unit 3 is connected to the control unit 2, the data processing unit controller 2a starts the operation unit 3a, the input/output selector 2d and the disk controller 2b in the data input mode and waits for informs from the operation unit 3a and the input/output selector 2d and the disk controller 2b (steps 173, 174, 174-1, 175, 176 shown in FIG. 10).

The input/output selector 2d, when data is inputted thereto (steps 195, 198, 200, 202 shown in FIG. 33), informs the data processing unit controller 2a of a data input (step 197). This is the operation performed by the input/output selector 2d when a data input signal is inputted, as shown in FIG. 28.

The operation unit 3a recognizes that the data has been transferred to the input buffer 3b. Next, if a search condition has been inputted to the condition buffer 3c, the operation unit 3a selects data stored in the input buffer 3b in accordance with the search condition and transfers the result to the output buffer 3d. If the condition buffer 3c is not loaded with a search condition, data stored in the input buffer 3b is transferred as it is to the output buffer 3d, and the operation unit 3a informs the data processing unit controller 2a of a search termination. Thus, even if the data processing unit 3 is connected to the control unit 2 at an arbitrary time, a page transfer request can be normally performed.

The data processing unit controller 2a, upon receiving the informs from the input/output selector 2d and the operation unit 3a (steps 175, 176 as shown in FIG. 30), starts the input/output selector 2d in a data output mode (step 177) and waits for an inform of termination from the input/output selector 2d (step 178).

The input/output selector 2d recognizes the data output (steps 195, 198, 200, 202) and informs the data processing unit controller 2a of an data output (steps 204, 197). This is the operation performed by the input/output selector 2d when a data output signal is inputted, as shown in FIG. 28. The data processing unit controller 2a thus informs the channel interface 2c of the data output (steps 178, 179 in FIG. 30 and steps 157, 158 in FIG. 29). On the contrary, if the data processing unit 3 is not connected to the control unit 2 (steps 183, 184 shown in FIG. 30), the data processing unit controller 2a starts the input/output selector 2d without input signal and waits for an inform from the input/output selector 2d (steps 183, 184 shown in FIG. 31A).

The input/output selector 2d, when data is transferred, informs the data processing unit controller 2a of a data output (steps 195-197 shown in FIG. 33). This is the operation performed by the input/output selector 2d when no signal is inputted, as shown in FIG. 28.

The data processing unit controller 2a, upon receiving the inform from the input/output selector 2d (step 184 shown in FIG. 31A), informs the channel interface 2c of the data output (step 185 in FIG. 31A and steps 157, 158 in FIG. 29).

(iv) The above described processing (ii) and (iii) are respectively repeated twice.

Figure 34:
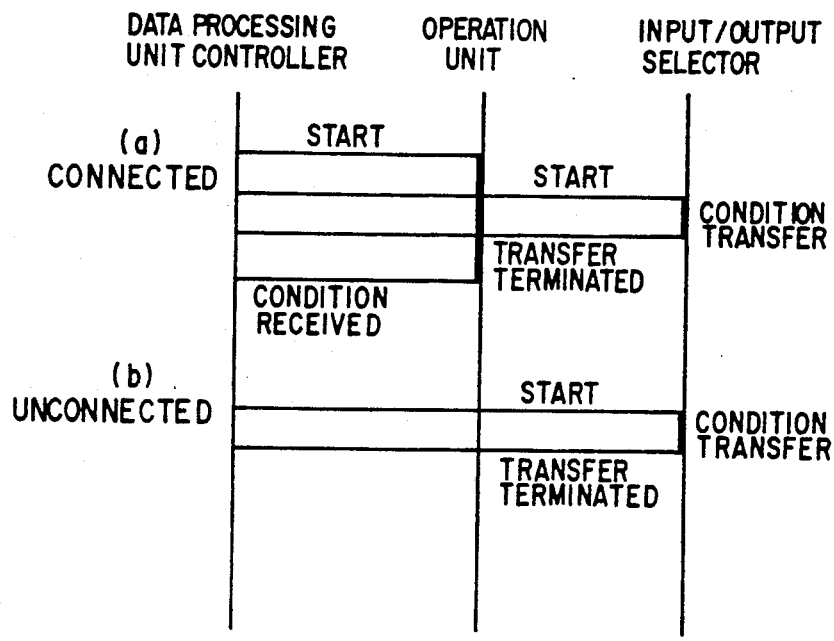
FIGS. 34, 35 and 36 are timing charts showing the operations of respective units used in the data processing system.
Figure 35:
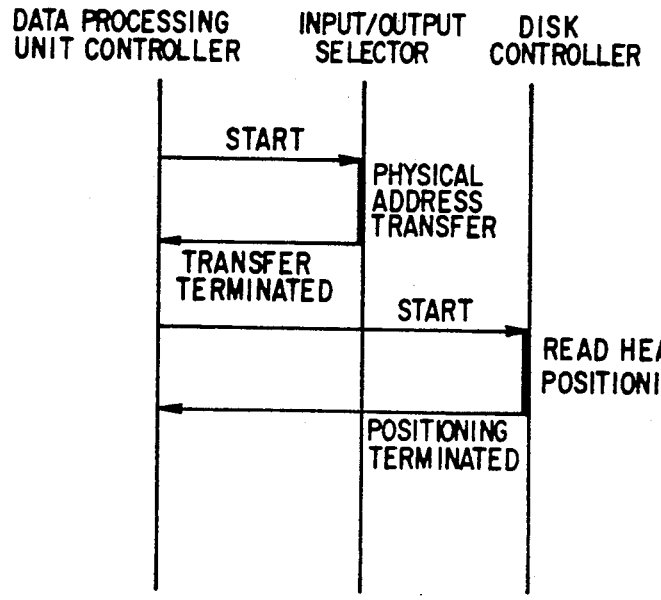
Figure 36:
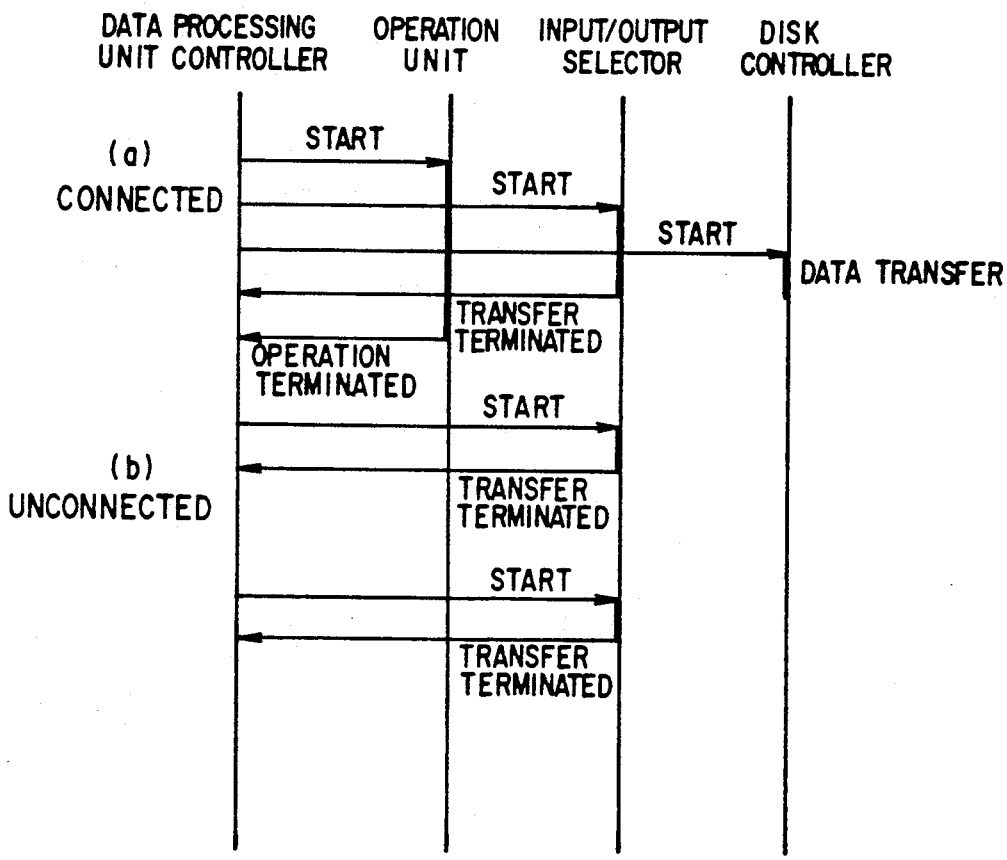

FIGS. 34, 35 and 36 are timing charts of the control unit and the data processing unit in respective starting conditions. More specifically, FIG. 34 shows a case where the starting condition is a condition output, wherein the operation unit 3a and the input/output selector 2d are both started when the data processing unit 3 is connected to the control unit 2 while the input/output selector 2d is solely started when it is not connected. FIG. 35 shows a case where the starting condition is a physical address transfer, wherein the input/output selector 2d is started when the data processing unit 3 is connected while the disk controller 2b is started when it is not connected. Further, FIG. 36 shows a case where the starting condition is a data input, wherein the operation unit 3a, the input/output selector 2d and the disk controller 2b are all started when the data processing unit 3 is connected to the control unit while the input/output selector 3d is solely started when it is not connected.

By thus controlling the operation unit 3a, the input/output selector 2d and the disk controller 2b, it is possible to request the data processing unit 3 to perform processing when the data processing unit 3 is connected to the control unit 2 and only perform a page transfer when it is not connected.

Next, the processing of the operation unit 3a provided in the data processing unit 3 will be described in detail.

Figure 15:
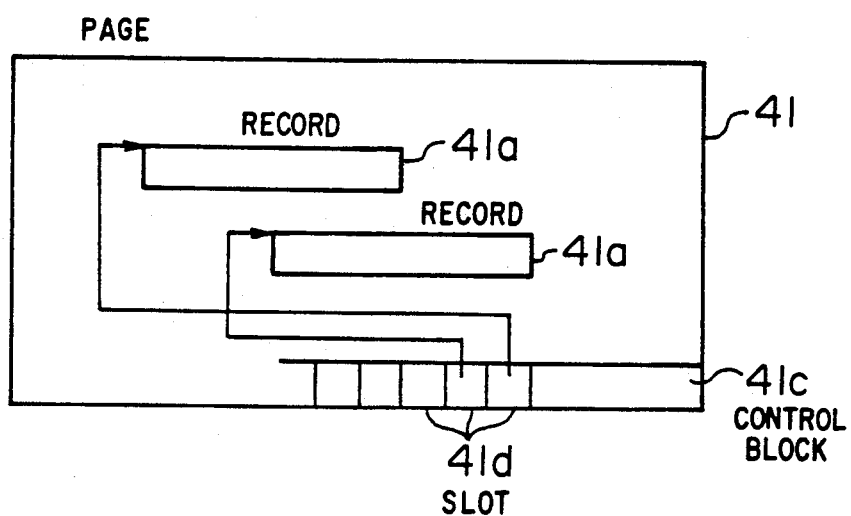
FIG. 15 is a diagram showing the structure of data stored in an input buffer arranged in the data processing unit.

FIG. 15 illustrates a page structure of data stored in the input buffer of the data processing unit, and FIG. 3 an outline of the processing performed by the operation unit 3a.

Data stored in the input buffer 3b has a page structure as shown in FIG. 15 such that a record 41a can be traced by a slot 41d which indicates an offset value from the head of a page 41. The slot 41d is positioned in front of a control block 41c positioned at the end of the page 41 for managing information in the page.

Figure 37:
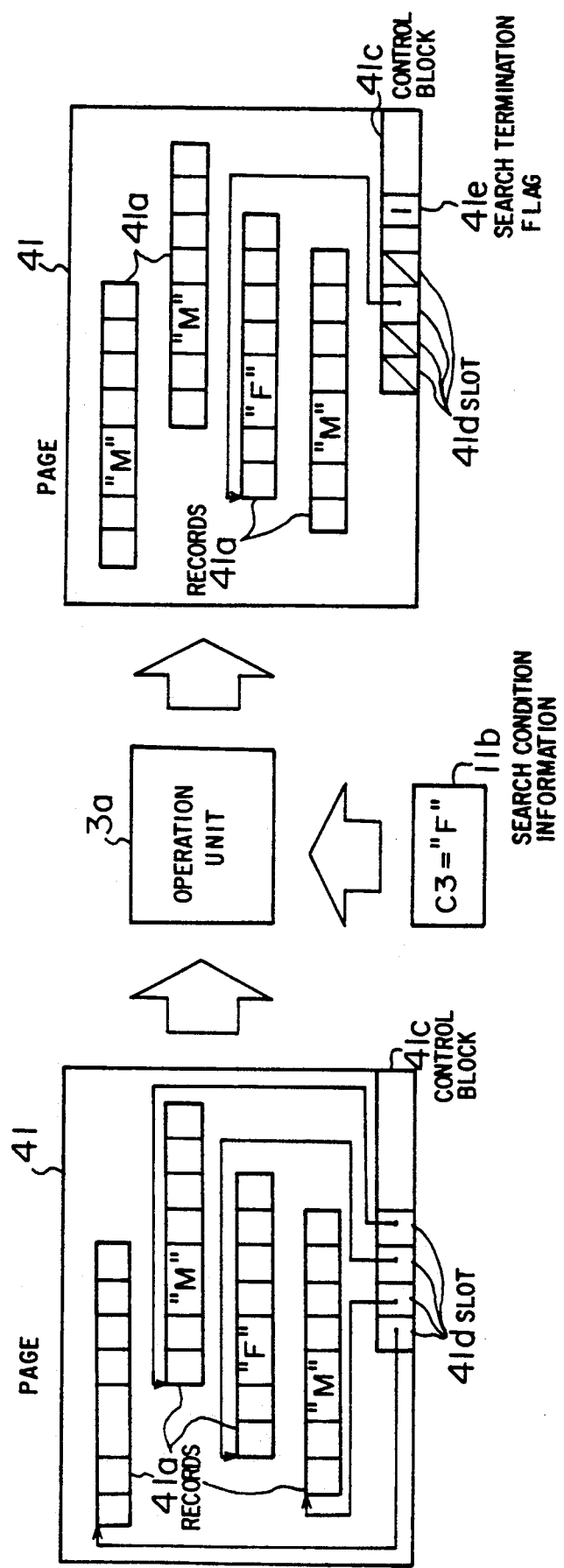
FIG. 37 is a diagram roughly showing an operation unit.

As shown in FIG. 37, the operation unit 3a, when started by the data processing unit controller 2a of the controller 2, takes out a search condition from the condition buffer 3c and selects records in the page stored in the input buffer 3b. In the example shown in FIG. 37, there exist four records in the page, three of which are records of man and only one of which is a record of woman. The search condition in the condition buffer 3c is C3='F', that is, the third column indicates that the record is of woman. Therefore, the first, third and fourth slots 41d are deleted, and the second record only remains, as shown in the drawing. Also, a search termination flag 41e in the control block 41c is set to "on" for informing the DBMS that the data processing unit 3 has operated.

Next, the processing of the DBMS 6 after a data transfer has been completed will be described in detail.

Figure 38:
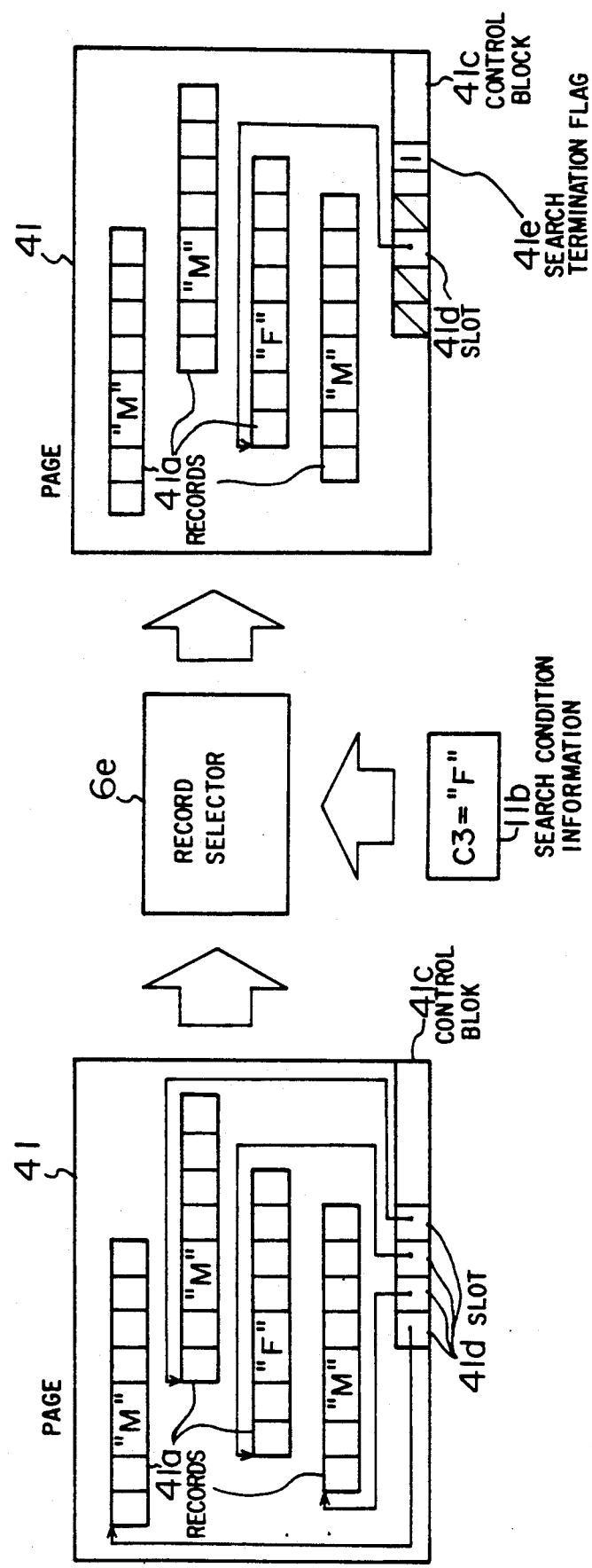
FIG. 38 is a diagram roughly showing the operation of a record selector.
Figure 39:
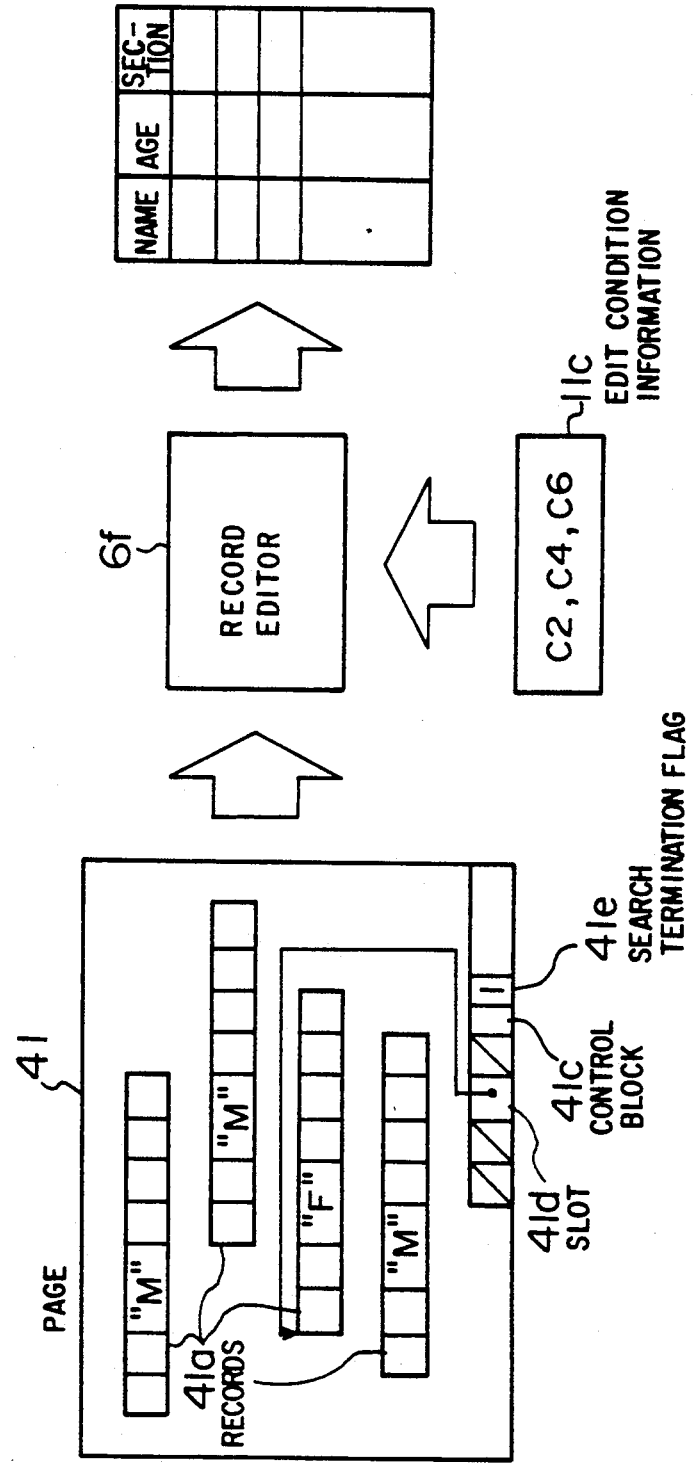
FIG. 39 is a diagram roughly showing the operation of a record editor.
Figure 40:
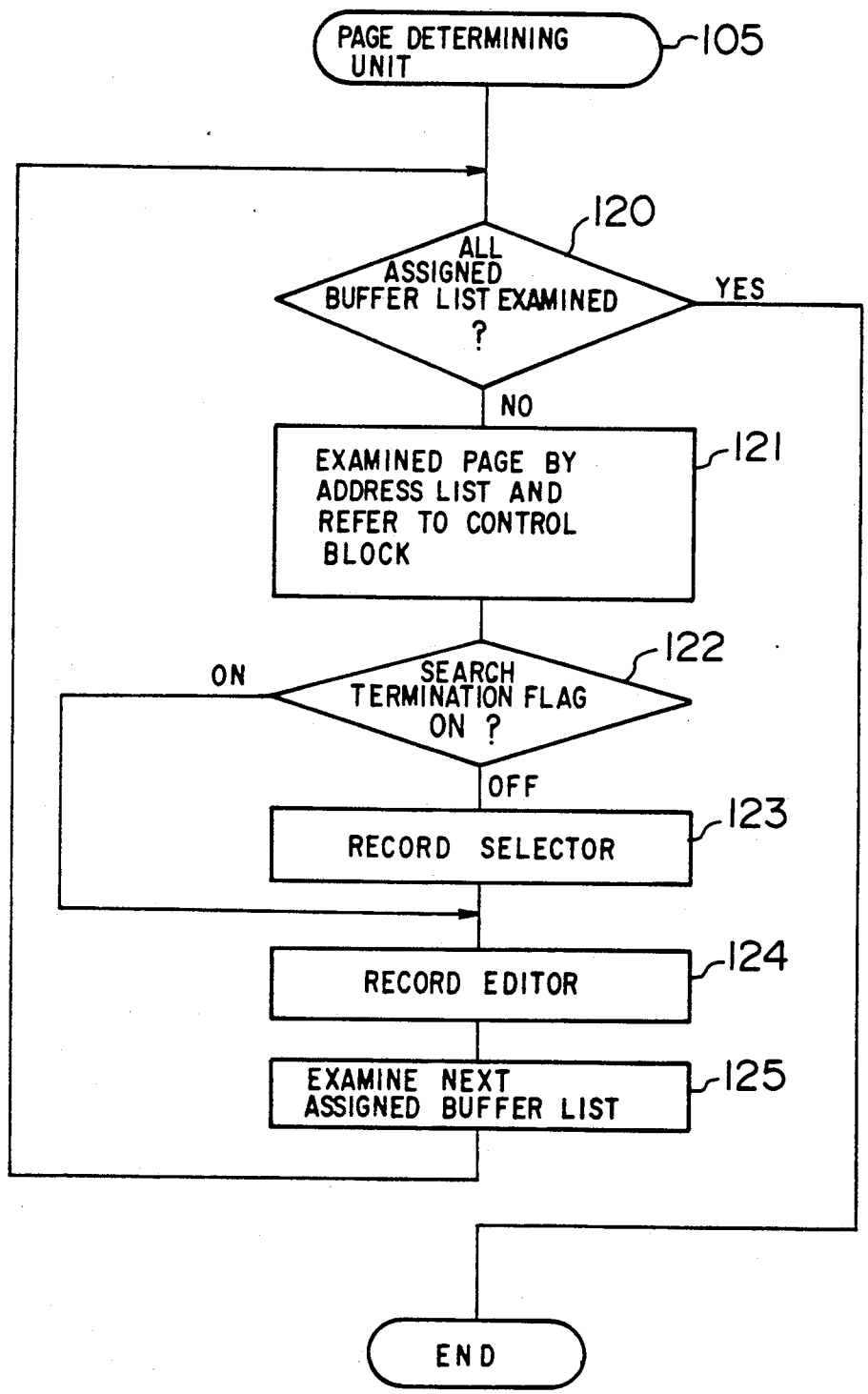
FIG. 40 is a flowchart showing the processing of a page determining unit.
Figure 41:
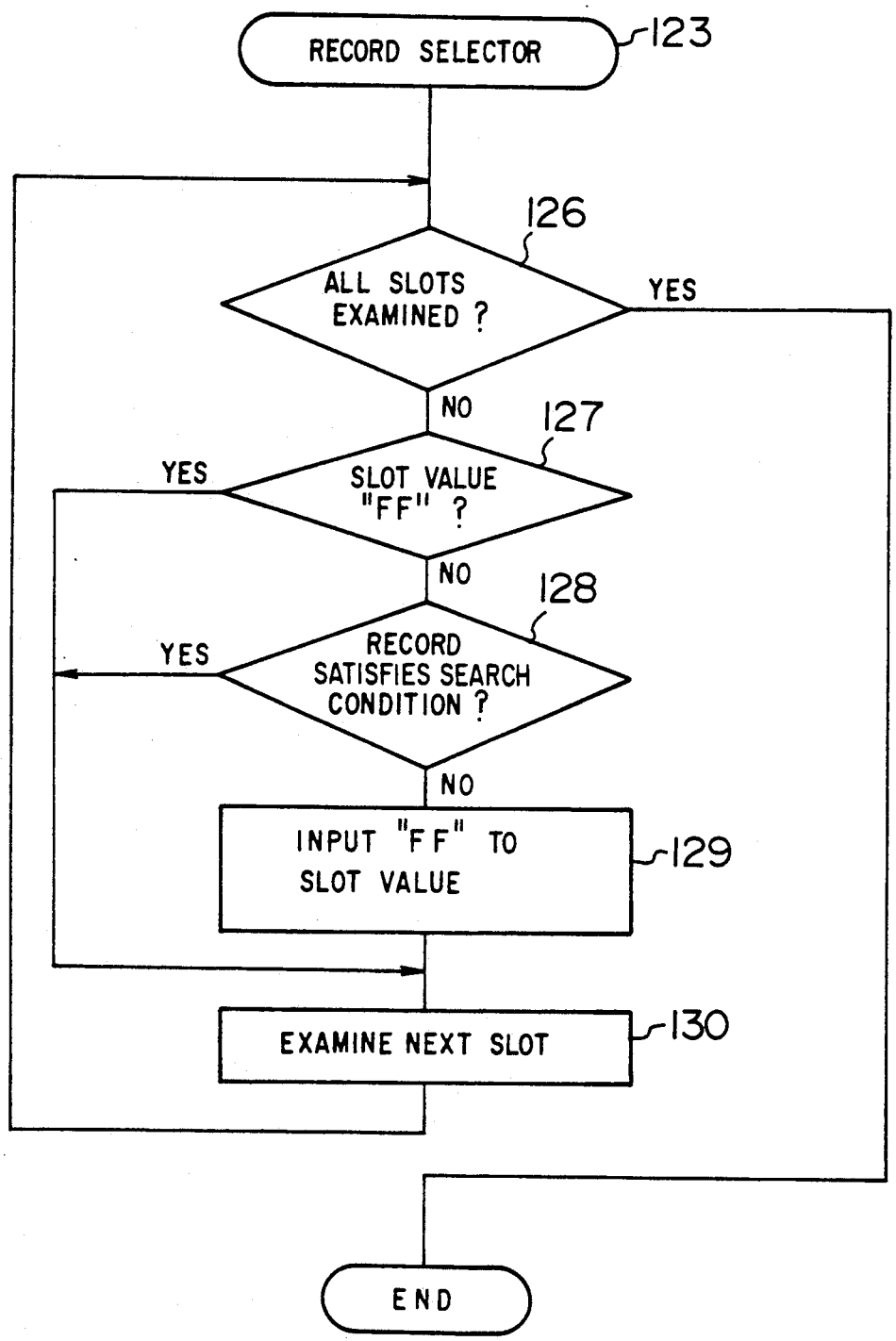
FIG. 41 is a flowchart showing the processing of the record selector.
Figure 42:
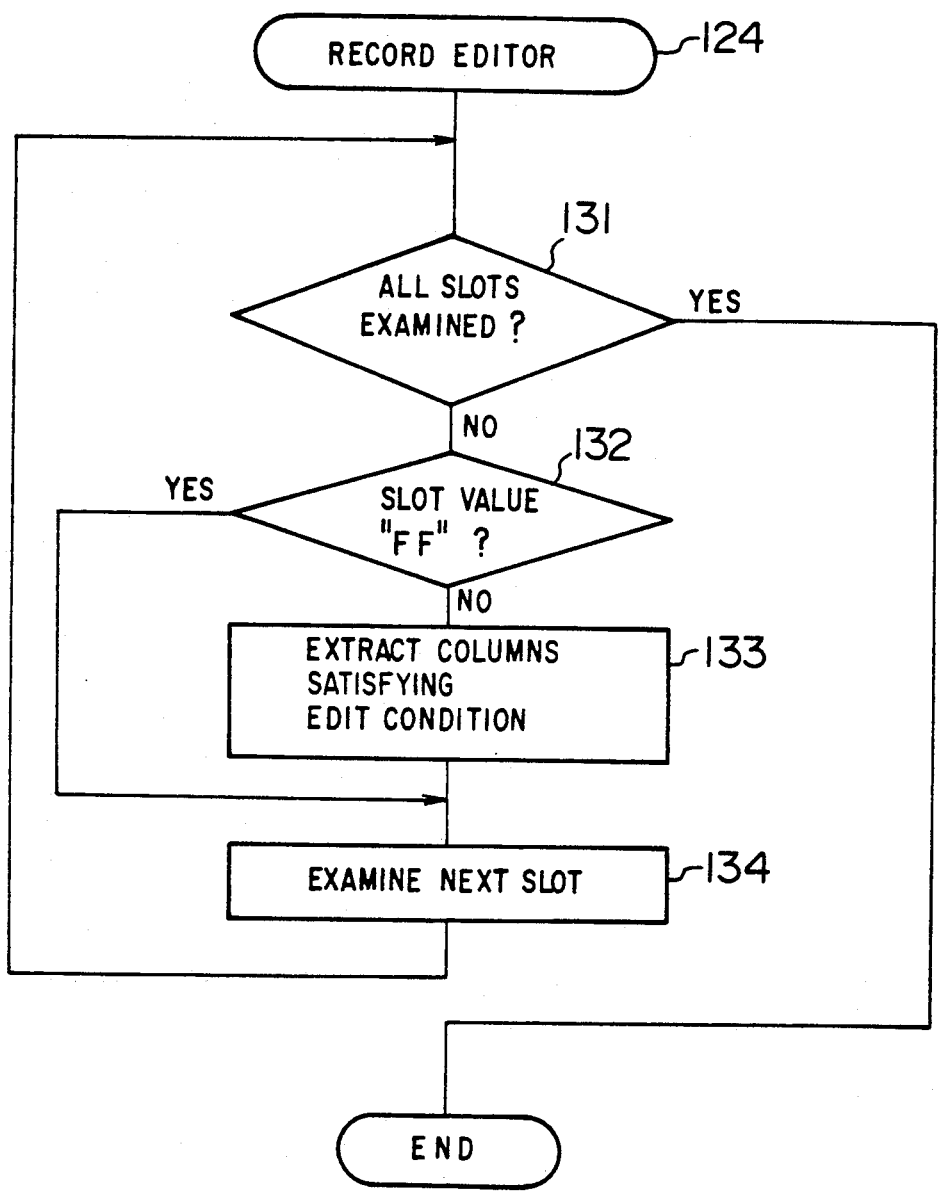
FIG. 42 is a flowchart showing the processing of the record editor.
Figure 43:
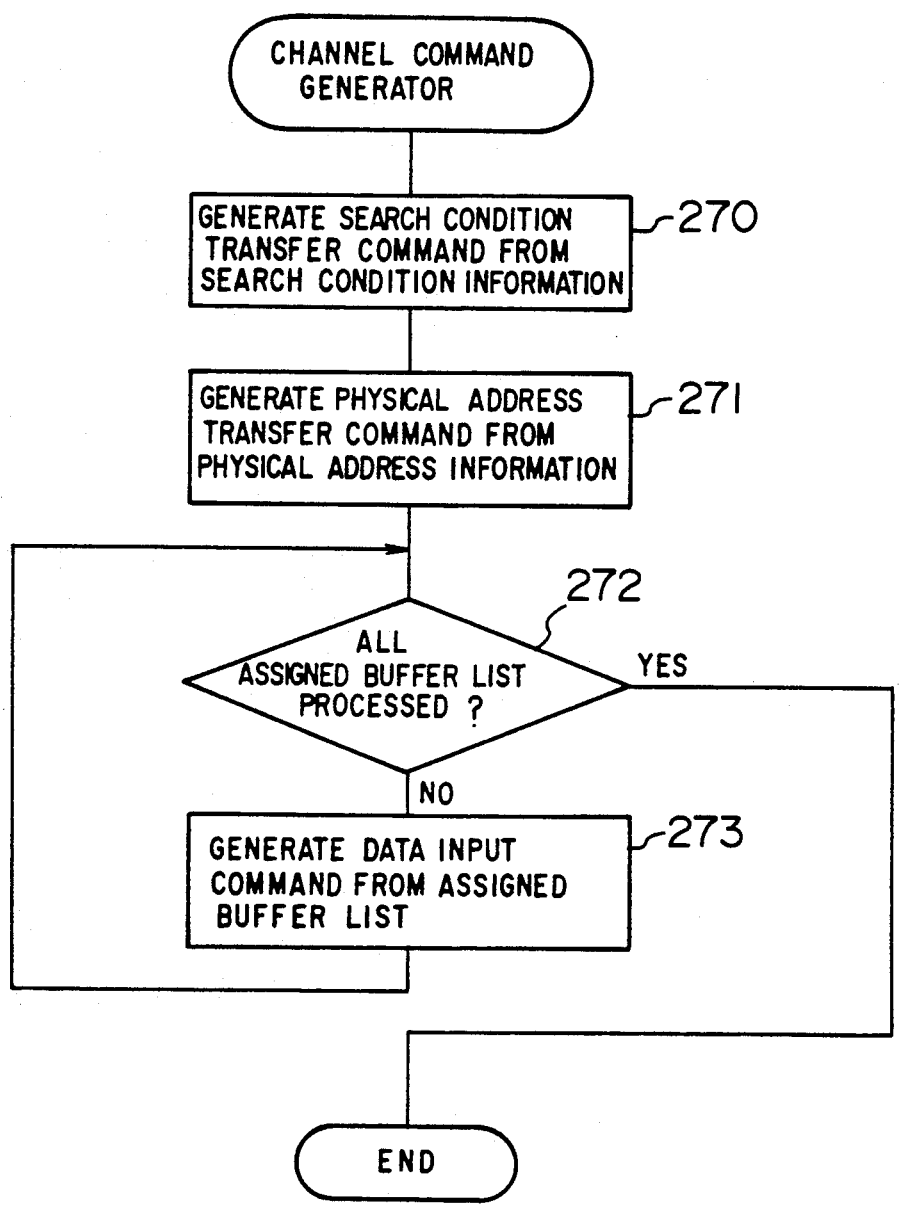
FIG. 43 is a processing flowchart of a channel command generator showing a third embodiment of the present invention.

FIGS. 38 and 39 illustrate outlines of the processing performed by the record selector and the record editor shown in FIG. 12, respectively, and FIGS. 40, 41 and 42 are flowcharts respectively showing the processing performed by the page determining unit, the record selector and the record editor provided in the DBMS also shown in FIG. 12.

After data has been transferred, the control is given to the page determining unit 6a (step 105 shown in FIG. 17). The page determining unit 6a examines the assigned buffer list 14 (step 120 shown in FIG. 40) and refers to the search termination flag 41e included in the control block 41c in a page transferred to the buffer (steps 121, 122). If the search termination flag 41e is on, indicating that the data processing unit 3 has operated, the page determining unit 6a only starts the record editor 6f (step 124) and examines the next assigned buffer list (step 125). On the contrary, if the search termination flag is off (step 122), indicating that the data processing unit 3 has not operated, the page determining unit 6a calls the record selector 6g and the record editor 6f (steps 123, 124) and examines the next buffer list (step 125).

As shown in FIG. 38, the record selector 6e performs the same processing as that of the operation unit 3a shown in FIG. 37 (steps 123-130 shown in FIG. 41).

The record editor 6f, as shown in FIG. 39, refers to the edit condition information 11c and edits selected records in accordance with the edit condition information 11c (steps 132, 133 shown in FIG. 42) to accumulate search and edit results. In the example shown in FIG. 39, the edit condition information 11c includes C2, C4 and C6, which indicates the extraction of the second, fourth and sixth columns.

The above described operation enables the DBMS 6 to perform data search and edit without paying attention to whether or not the data processing unit 3 is connected to the control unit 2.

Next, a third embodiment of the present invention will be described.

The third embodiment differs from the second embodiment in that the latter comprises the channel command word interface which positions the read head every time a page is inputted while the former is provided with an interface which allows pages to be inputted in bulk such that a plurality of pages can be sequentially read out.

Figure 20:
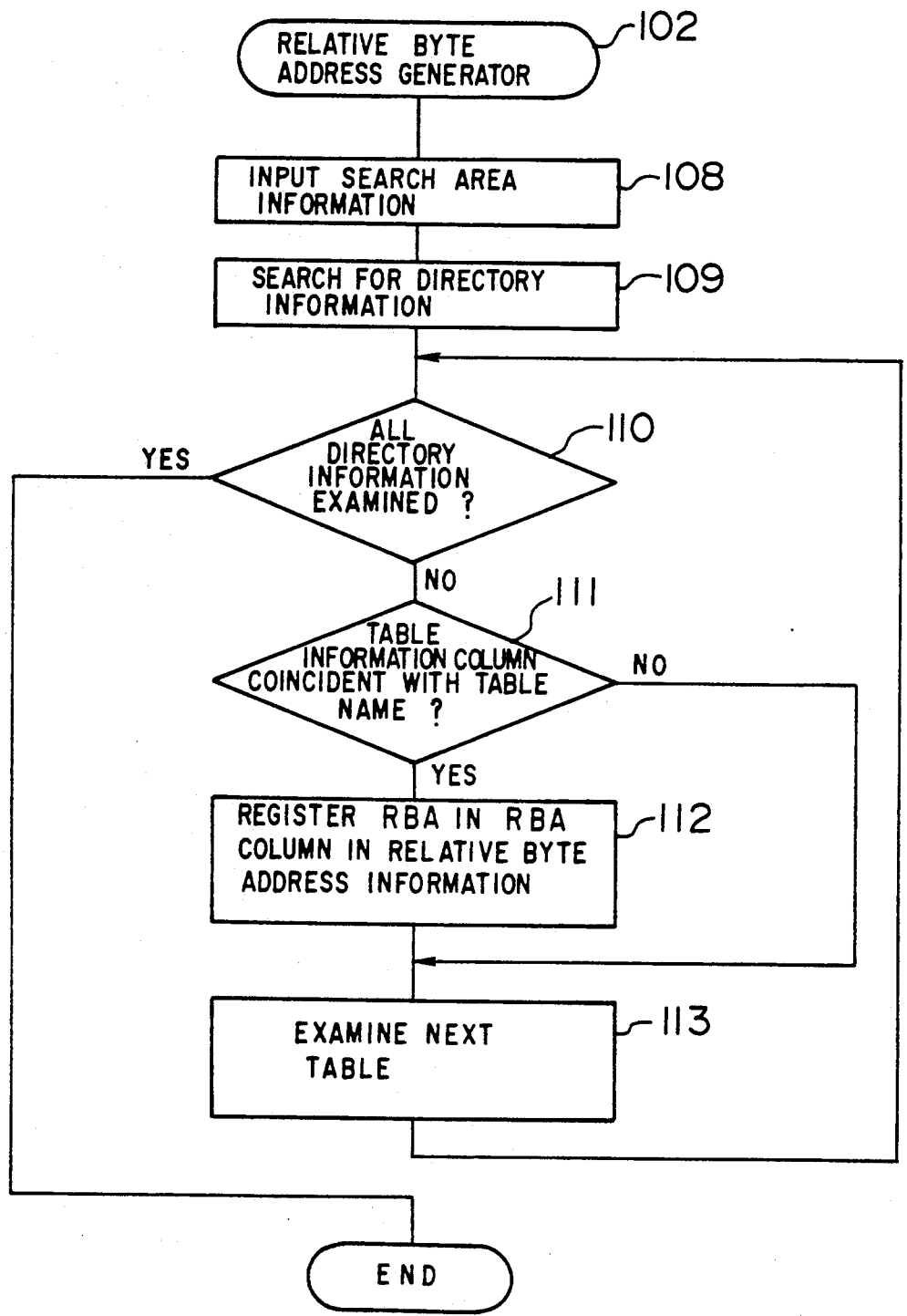
FIG. 20 is a flowchart showing the processing of the relative byte address generator.

Such feature and operation of the third embodiment will be explained in detail with reference to FIGS. 16, 17 and 18 as well as FIG. 19 roughly illustrating the operation of the relative byte address generator, FIG. 20 illustrating the processing flowchart of the relative byte address generator, FIG. 21 illustrating the processing flow of the reception area assigning unit, and FIG. 22 roughly illustrating the operation of the reception area assigning unit.

The operation request generator 6b of the DBMS 6, when receiving a search request from the user, converts the search request to search area information 11a, search condition information 11b and edit condition information 11c (step 101 shown in FIG. 17). Next, the DBMS 6 transfers the control to the relative byte address generator 6c for converting the search area information 11a generated by the operation request generator 6b to the list 12 of relative byte address (step 102 shown in FIG. 17).

The relative byte address generator 6c examines directory information 8 generated when the DBMS 6 produces a database for managing mapping information between a table and a logical address as shown in FIG. 19 to convert the search area information 11a to the list 12 of relative byte address.

The DBMS 6 next transfers the control to the reception area managing unit 6d for assigning reception areas necessary to execute the search request (step 103 shown in FIG. 17). The reception area managing unit 6d, as shown in FIG. 22, first refers to a list count field 12a in the list 12 of relative byte address to prepare the same number of buffers as the number written therein. Next, the reception area managing unit 6d determines a request number 16, unique in the DBMS 6, as the identifier for this search request 11 (steps 116, 117 shown in FIG. 21). Then, referring to a buffer managing table 15, a number of buffers, determined by unassigned buffers, are reserved (steps 114, 115), and the addresses of the reserved buffers are extracted to the assigned buffer list 14 (steps 118, 119). The DBMS 6 thereafter issues a search request to the data access program 7 (step 104 shown in FIG. 17).

The above-mentioned operation will be further described in detail with reference to FIGS. 23 and 24 respectively illustrating the processing flow of the data access program and the physical address generator and FIG. 4 roughly illustrating the operation of the physical address generator.

The data access program 7, upon receiving the search request from the DBMS 6, transfers the control to the physical address generator 7b (step 135 shown in FIG. 23).

The physical address generator 7b, as shown in FIG. 4, converts the list 12 of relative byte address generated by the DBMS 6 to physical address information 13 where each relative byte address in the list 12 is converted to a corresponding physical address by extent information 9 (steps 135-140 shown in FIG. 24).

The data access program 7 next transfers the control to the channel command generator 7a which generates an operation request command group for starting the control unit 2 (step 136 shown in FIG. 23).

The operation performed by the channel command generator will be described with reference to FIG. 25 roughly illustrating the operation of the channel command generator and FIG. 26 illustrating the processing flow of the channel command generator.

The channel command generator 7a, as shown in FIG. 25, receives the physical address information generated by the physical address generator 7b, the search condition information received from the DBMS 6 and the assigned buffer list 14 to generate a data operation request command group from these received information (steps 141-144 shown in FIG. 26). In the example shown in FIG. 25, it is assumed that the channel command generator 7a receives all of the physical address information 13, the search condition information 11b and the assigned buffer list 14, assigns four buffers to the assigned buffer list 14 as shown in FIG. 22, and designates AD2, AD4 and AD6 to the assigned buffer addresses.

Next, outlines of the channel 1, the control unit 2, the data processing unit 3 and the disk 4 will be explained.

Figure 44A:
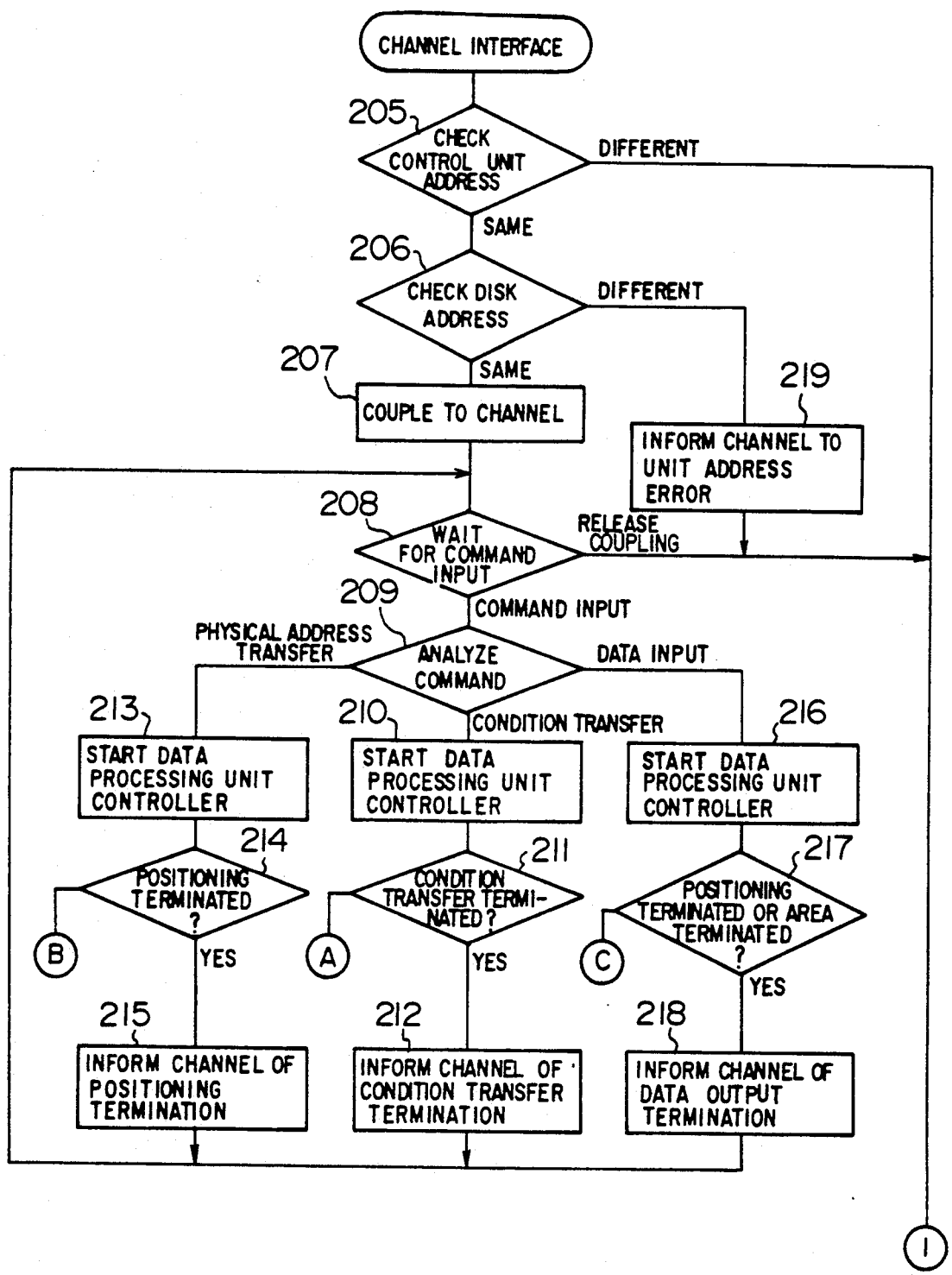
FIGS. 44A and 44B are flowcharts showing the processing of a channel interface used in the third embodiment.
Figure 44B:
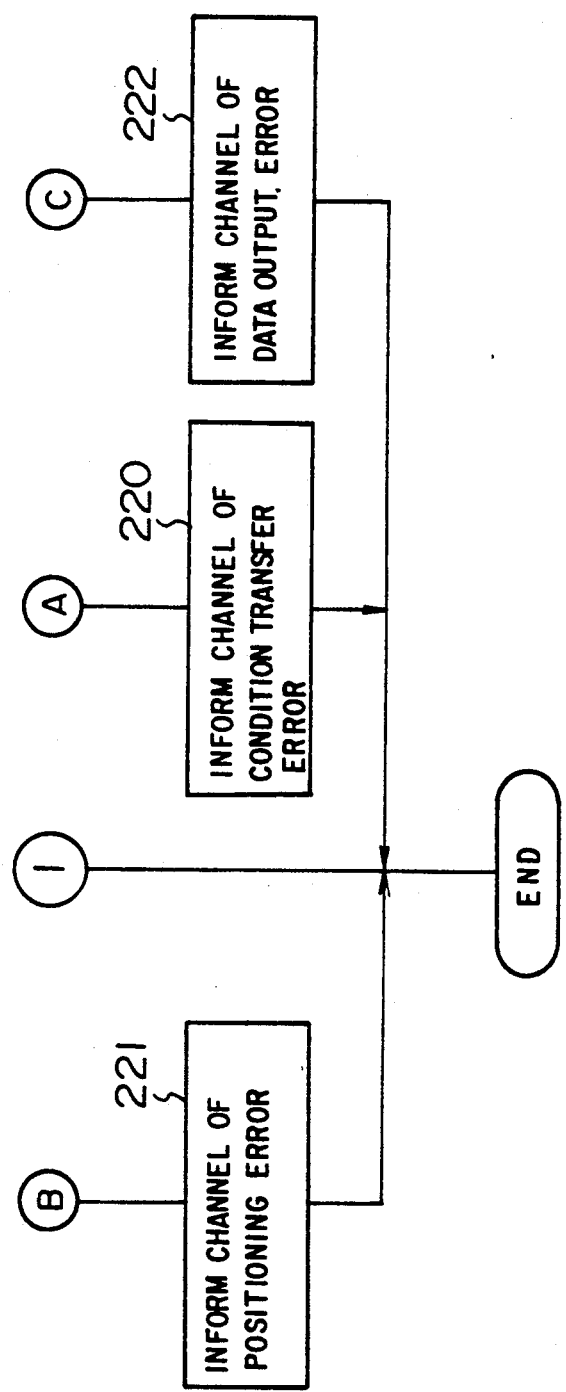
Figure 45A:
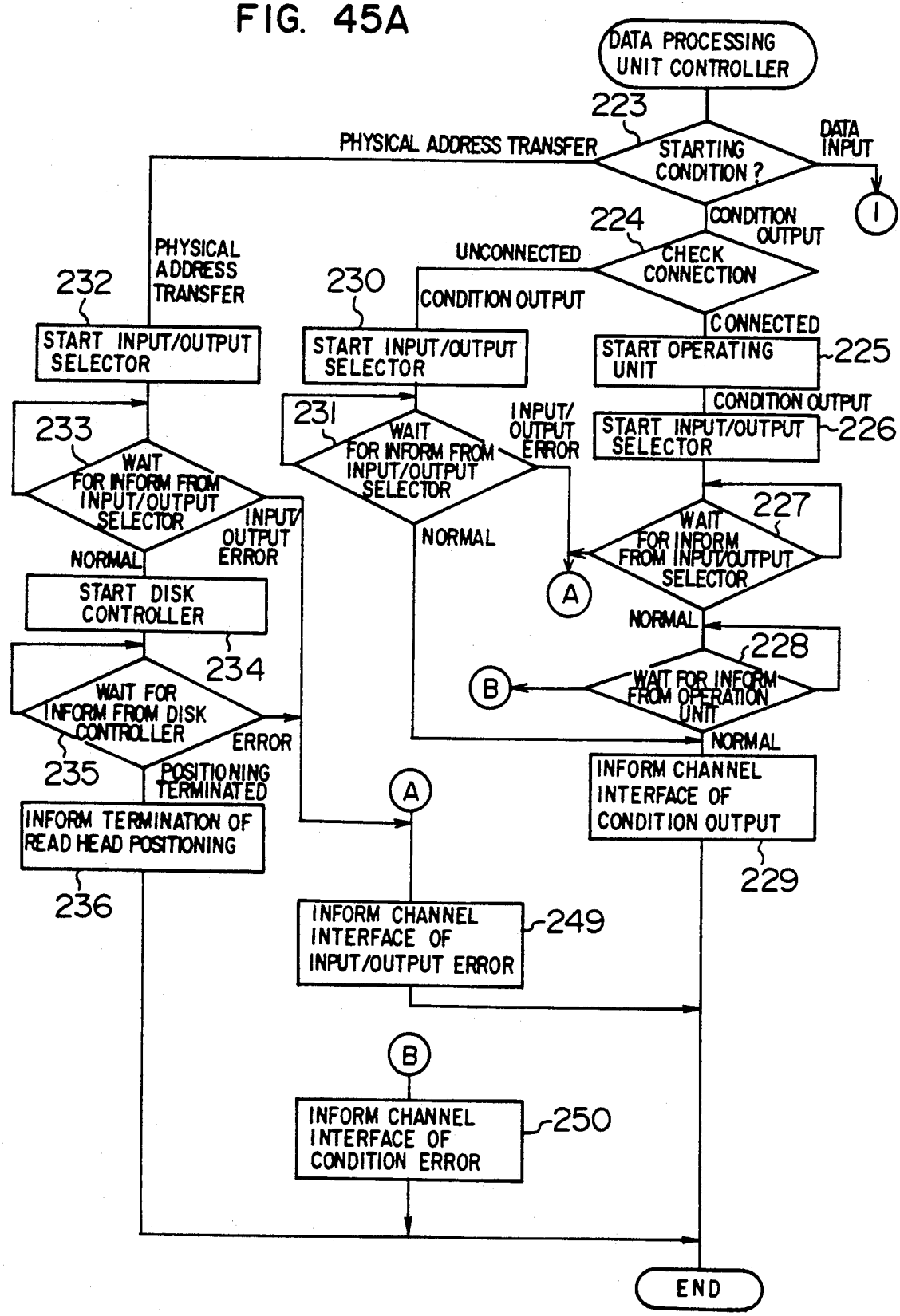
FIGS. 45A and 45B are flowcharts showing the processing of a data processing unit controller used in the third embodiment.
Figure 45B:
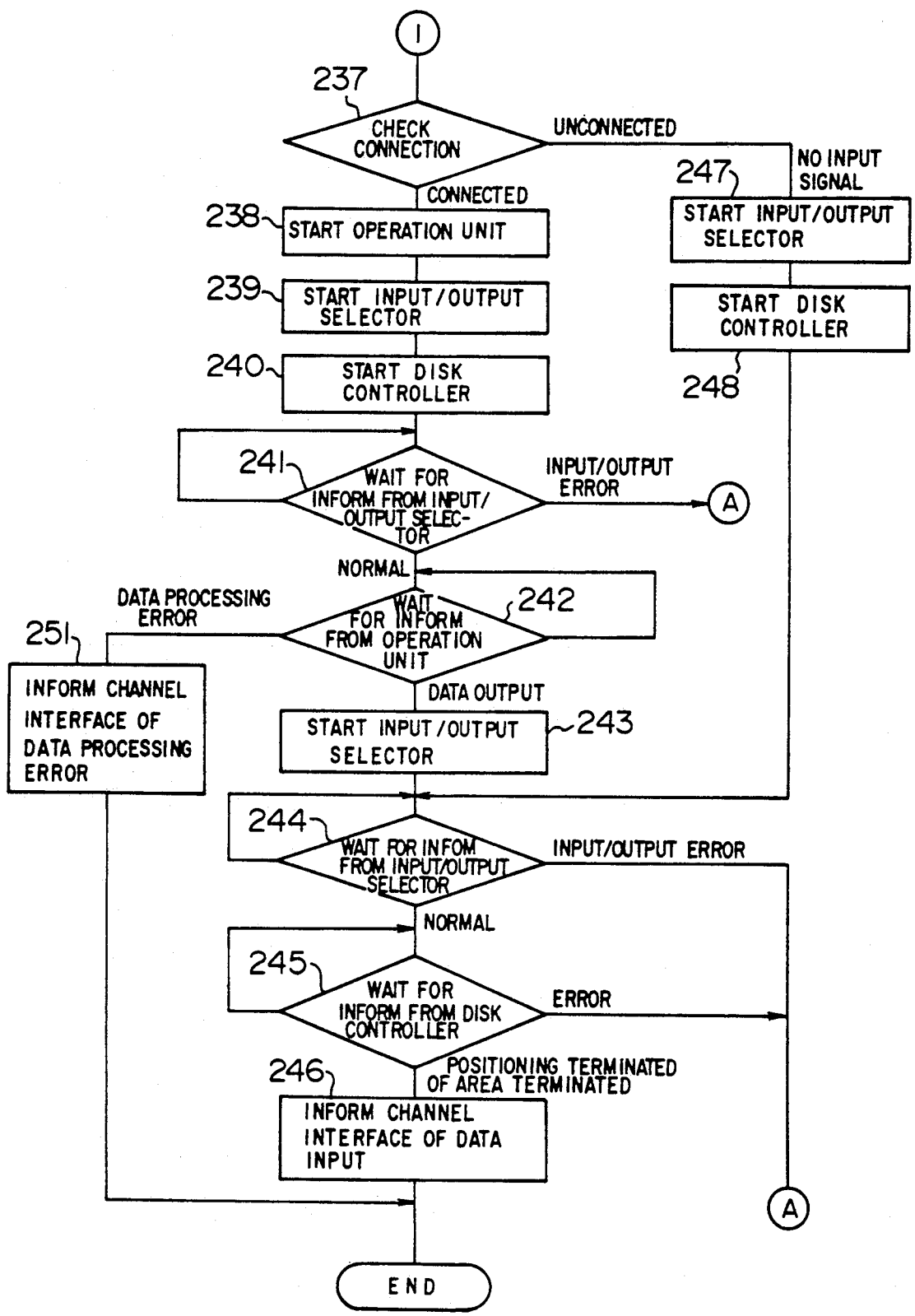
Figure 46:
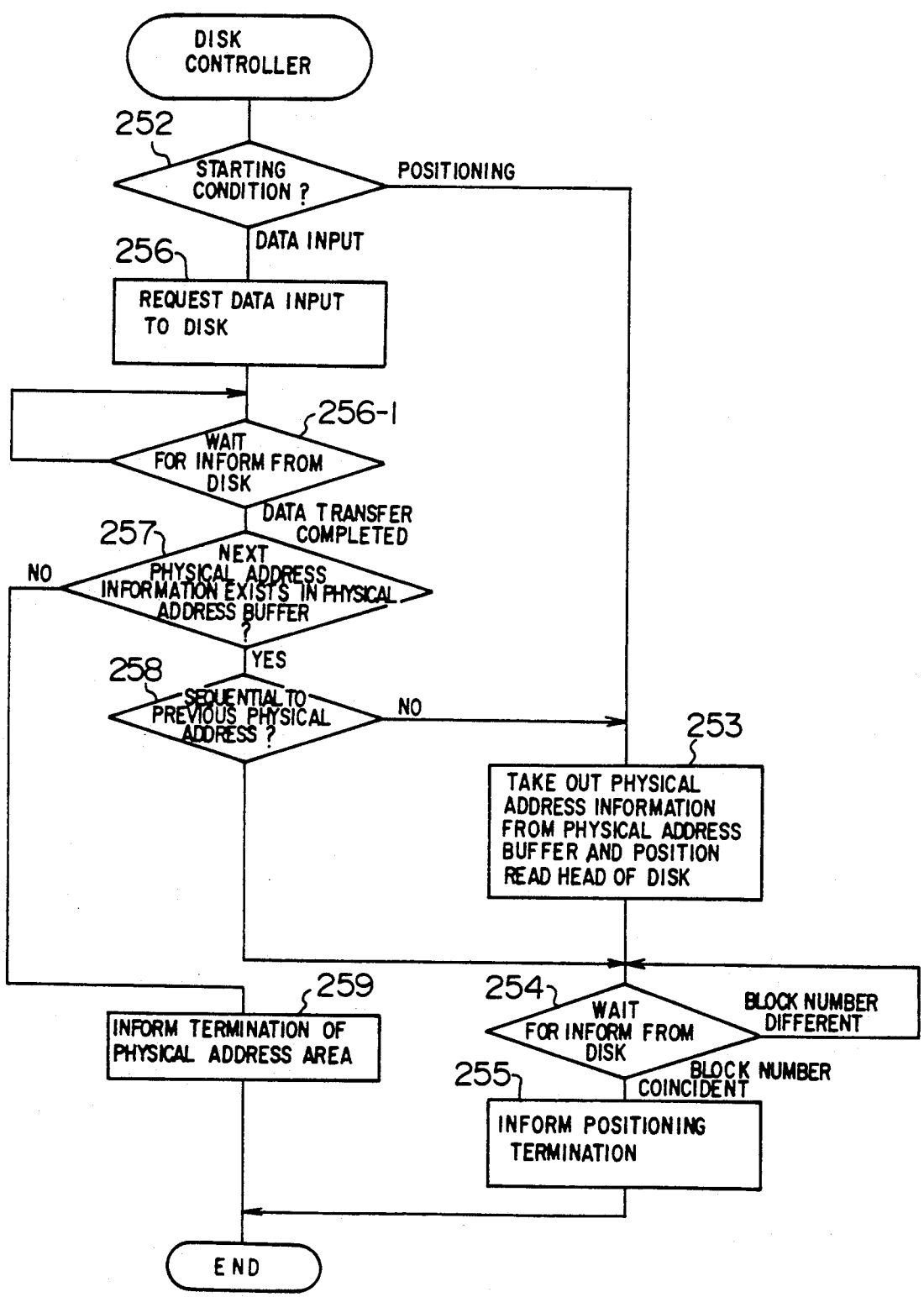
FIG. 46 is a flowchart showing the processing of a disk controller used in the third embodiment.
Figure 47:
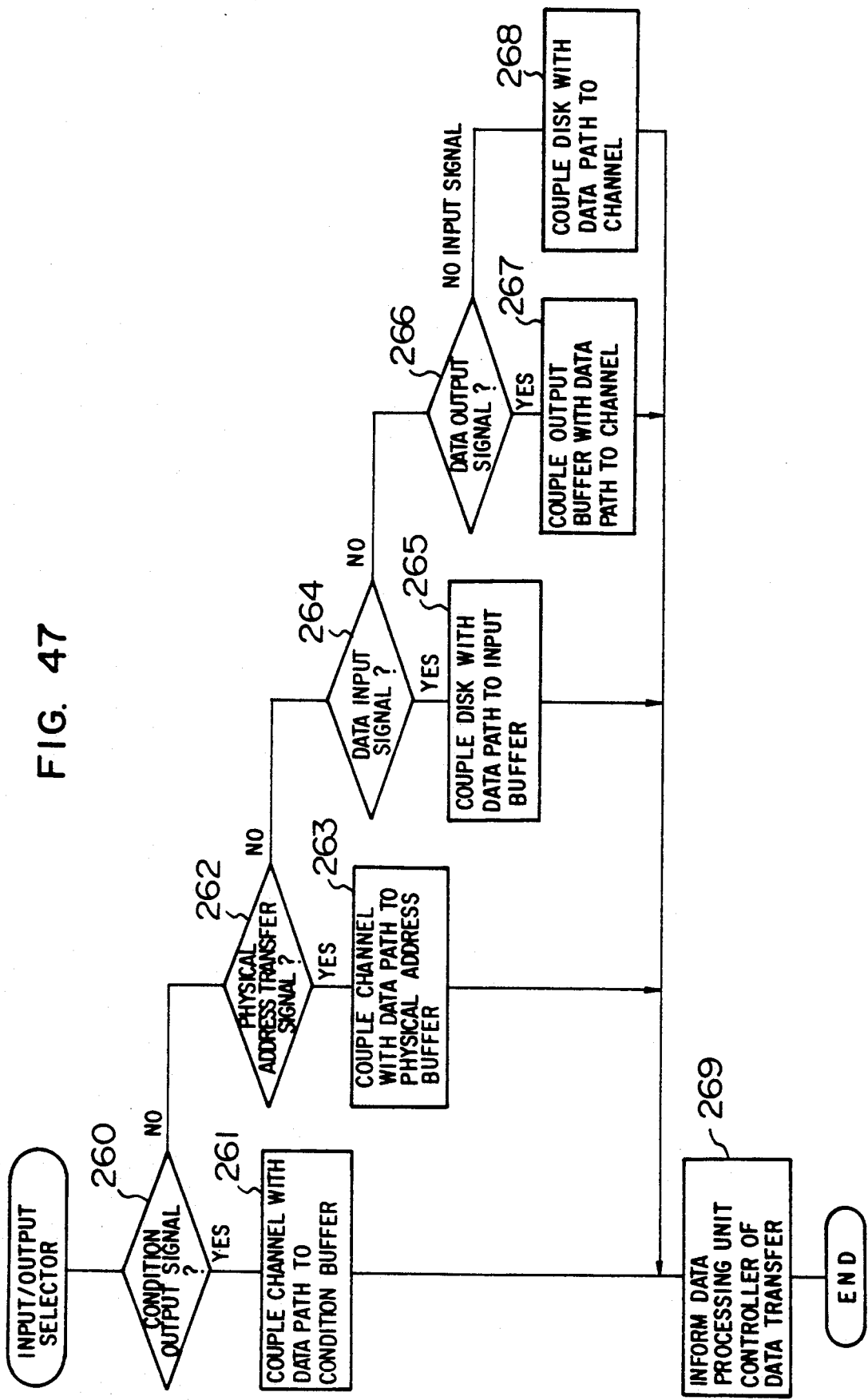
FIG. 47 is a flowchart showing the processing of an input/output selector used in the third embodiment.

FIGS. 44A and 44B illustrate the processing flow of the channel interface provided in the control unit, FIGS. 45A and 45B that of the data processing unit controller, FIG. 46 that of the disk controller, and FIG. 47 that of the input/output selector.

First, the interface between the channel 1 and the control unit 2 will be described. The channel 1, upon receiving a channel command word group from the data access program 7, transfers a unit address 12 to the control unit 2 as a starting signal.

The unit address 12 is composed of a control unit address 12a and an address 12b of a disk which records data to be extracted. The channel interface of the control unit 2, as shown in FIG. 44A, first checks the control unit address 12a (step 205), further checks the disk address 12b (step 206), and is coupled to the channel 1 if both addresses are coincident (step 207). The channel 1, when coupled to the control unit 2, transfers a command code 10a as a start signal to the control unit 2. The channel command word group inputted from the channel 1 is composed of a search condition transfer command 10a, a physical address transfer command 10b and a data input command 10c, and these commands are started by the channel 1 in this order.

(i) First, the channel interface 2c, when recognizing the search condition transfer command 10a, starts the data processing unit controller 2a in a condition transfer mode (steps 208, 209, 210 shown in FIG. 44A).

The data processing unit controller 2a, as shown in FIG. 45B, checks the connection of the data processing unit 3 (step 237), and if the data processing unit 3 is connected to the control unit 2, the data processing unit controller 2a starts the operation unit 3a and the input/output selector 2d in the condition transfer mode (steps 238, 239), and waits for informs from the operation unit 3a and the input/output selector 2d.

The input/output selector 2d, on the other hand, when the search condition is transferred thereto (steps 260, 261), informs the data processing unit controller 2a of a search condition (step 269), while the operation unit 3a recognizes that the search condition has been transferred to the condition buffer 3c and informs the data processing unit controller 2a of a receipt of a search condition, as shown in FIG. 47.

The data processing unit controller 2a, as shown in FIG. 45A, receives the informs from the input/output selector 2d and the operation unit 3a and informs the channel interface 2c of a search condition output (steps 227, 228, 229 in FIG. 45A and steps 211, 212 in FIG. 44A). If the data processing unit 3 is not connected to the control unit 2, the data processing unit 2a starts the input/output selector 2d in the condition transfer mode and waits for an inform from the input/output selector 2d (steps 223, 224, 230, 231 shown in FIG. 45A).

The input/output selector 2d, when the search condition is transferred thereto (steps 260, 261), informs the data processing unit controller 2a of a condition transfer (step 269). The data processing unit controller 2a, upon receiving the inform from the input/output selector 2d, informs the channel interface 2c of the search condition output (steps 211, 212 in FIG. 44A and steps 231, 229 in FIG. 45A).

(ii) Next, the channel interface 2c, when recognizing the physical address transfer command 10b (steps 208, 209 shown in FIG. 44A), starts the data processing unit controller 2a in a physical address transfer mode (step 213).

The data processing unit controller 2a starts the input/output selector 2d in the physical address transfer mode and waits for an inform from the input/output selector 2d (steps 223, 232 shown in FIG. 45A).

The input/output selector 2d, when the physical address information is transferred thereto, informs the data processing unit controller 2a of a physical address information transfer (steps 260, 262, 263, 269 shown in FIG. 47).

The data processing unit controller 2a, upon receiving the inform of physical address information transfer, starts the disk controller 2b (steps 233, 234 shown in FIG. 45A).

The disk controller 2b controls the disk 4 to position a read head (steps 252, 253 shown in FIG. 46), and then, when receiving an inform of read head positioning termination (step 254), informs the data processing unit controller 2a of a positioning termination (step 255).

The data processing unit controller 2a, upon receiving the inform from the disk controller 2b, informs the channel interface 2c of the positioning termination (steps 214, 215 in FIG. 44A and steps 235, 236 in FIG. 45A).

(iii) Next, the channel interface 2c, when recognizing the data input command 10c, starts the data processing unit controller 2a in a data input mode (steps 208, 209, 216 shown in FIG. 44A).

The data processing unit controller 2a checks the connection of the data processing unit 3, and if the data processing unit 3 is connected to the control unit 2, the data processing unit controller 2a starts the operation unit 3a, the input/output selector 2d and the disk controller 2b in the data input mode and waits for informs from the operation unit 3a, the input/output selector 2d and the disk controller 2b (steps 223, 237-240 shown in FIGS. 45A and 45B).

The disk controller 2b controls the disk 4 to request a data input (steps 252, 256 shown in FIG. 46), and examines whether or not physical address information exists in the physical address buffer 2e upon receiving the inform of data transfer termination (steps 256-1, 257). If it is detected that the next physical address information exists, the disk controller 2b performs an input operation for the next page. For thus inputting the next page, if the next physical address information is sequential to the previous physical address, the disk controller 2b waits for an inform of correct block number from the disk 4. Contrarily, if it is not sequential, the disk controller 2b controls the disk 4 to position the head and then waits for the inform of correct block number from the disk 4 (steps 252, 256, 257, 258, 253, 254). This operation enables the disk controller 2b to perform a read head positioning in a reduced time when the physical addresses are sequential.

The input/output selector 2d, when data is inputted thereto, informs the data processing unit controller 2a of a data input (steps 260, 262, 264, 269 shown in FIG. 47).

The operation unit 3a recognizes that the data has been transferred to the input buffer 3b. Next, if a search condition has been inputted to the condition buffer 3c, the operation unit 3a selects data stored in the input buffer 3b in accordance with the search condition and transfers the result to the output buffer 3d. If the condition buffer 3c is not loaded with a search condition, data stored in the input buffer 3b is transferred as it is to the output buffer 3d, and the operation unit 3a informs the data processing unit controller 2a of a search termination. Thus, even if the data processing unit 3 is connected to the control unit 2 at an arbitrary time, a page transfer request can be normally performed.

The data processing unit controller 2a, upon receiving the informs from the input/output selector 2d and the operation unit 3a, starts the input/output selector 2d in a data output mode and waits for informs of termination from the input/output selector 2d and the disk controller 2b (steps 241, 242, 243 shown in FIG. 45B).

The input/output selector 2d, when recognizing the data output, informs the data processing unit controller 2a of a data output (steps 260, 262, 264, 266, 267, 269 shown in FIG. 47).

The disk controller 2b, upon receiving the inform of correct block number from the disk 4, informs the data processing controller 2a of the positioning termination (steps 254, 255 shown in FIG. 46). Following this operation, the data processing unit controller 2a informs the channel interface 2c of the data output (steps 244-246 in FIG. 45B and steps 217, 218 in FIG. 44A).

When the data processing unit 3 is not connected to the control unit 2, the data processing unit controller 2a starts the input/output selector 2d and the disk controller 2b without input signal and waits for informs from the input/output selector 2d and the disk controller 2b (steps 223, 237, 247, 248 shown in FIGS. 45A and 45B).

The input/output selector 2d, when data is transferred thereto, informs the data processing unit controller 2a of a data output (steps 260, 262, 264, 266, 268, 269 shown in FIG. 47).

On the other hand, the disk controller 2b, when receiving an inform of correct block number from the disk 4, informs the data processing unit controller 2a of a positioning termination (steps 254, 255 shown in FIG. 46). The data processing unit controller 2a, responsive to this, informs the channel interface 2c of the data output (steps 244-246 in FIG. 45B and steps 217, 218 in FIG. 44A).

(iv) The above described processing is repeated in the same manner. The coupling with the channel is released when the disk controller 2b, upon receiving the starting signal in the data input mode, examines the physical address buffer after issuing a data input request and it is detected that the next physical address does not exist. In this event, the disk controller 2b informs the data processing unit controller 2a of a physical address termination (steps 252, 256, 256-2, 257, 259 shown in FIG. 46).

The data processing unit controller 2a, upon receiving the inform of the physical address termination from the disk controller 2b, informs the channel interface 2c of the physical address termination, followed by releasing the coupling with the channel (steps 245, 246 in FIG. 45B and steps 217, 218, 208 in FIG. 44A).

Figure 48:
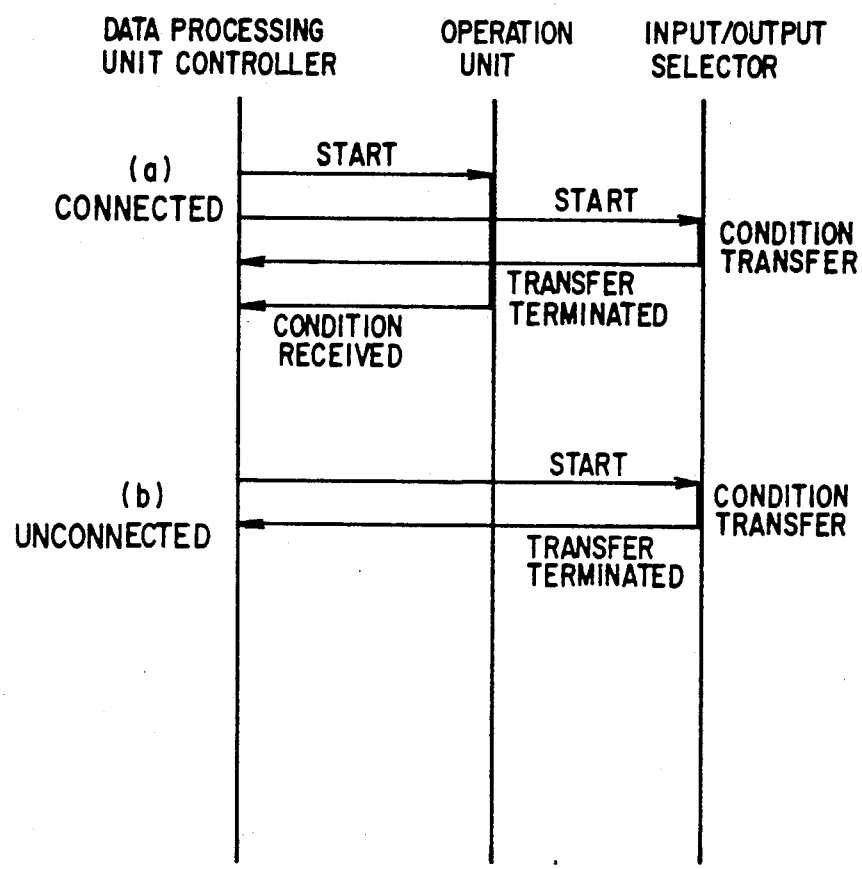
FIGS. 48, 49 and 50 are timing charts showing the operations of respective units used in the data processing system of the third embodiment.
Figure 49:
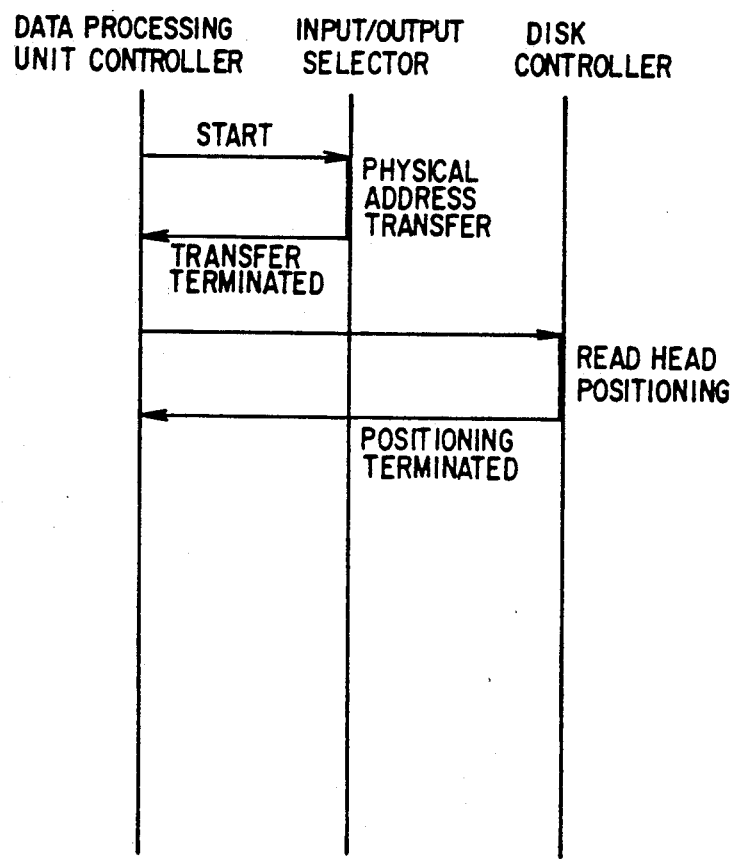
Figure 50:
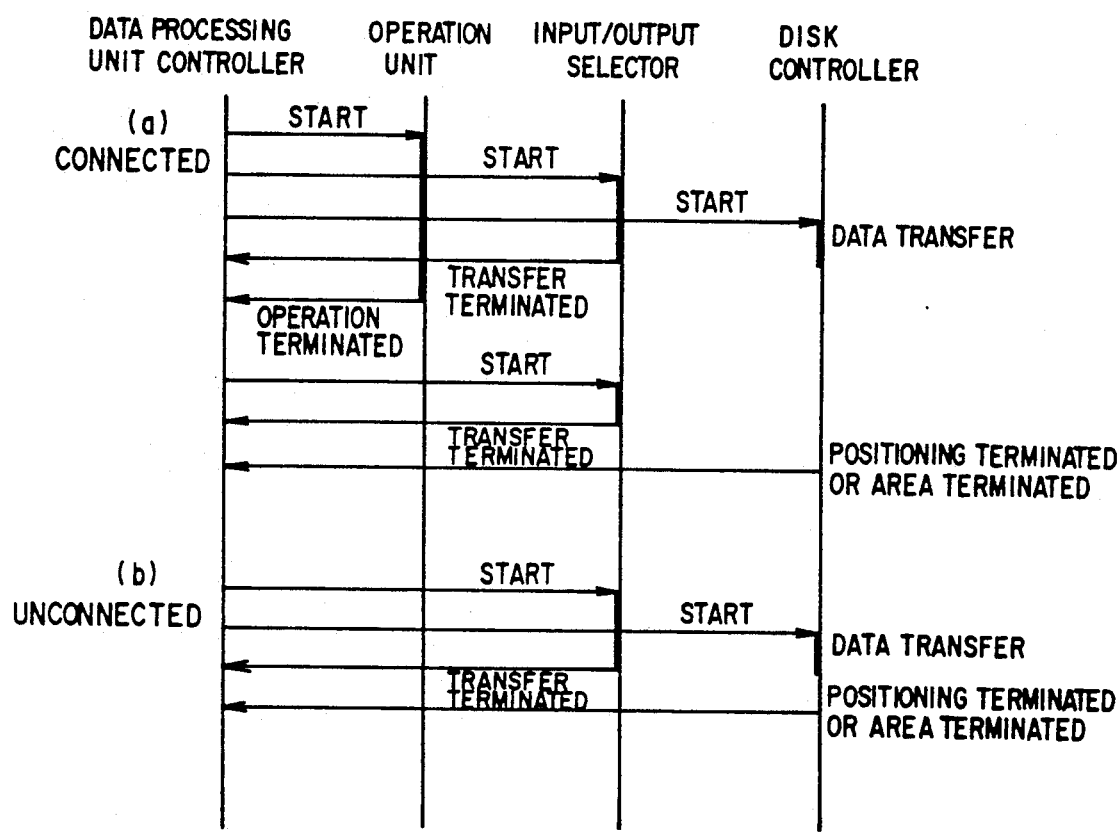

FIGS. 48, 49 and 50 are timing charts of the control unit and the respective controllers in the data processing unit in respective starting conditions. More specifically, FIG. 48 shows a case where the starting condition is a condition output, FIG. 49 a case where the starting condition is a physical address transfer, and FIG. 50 a case where the starting condition is a data input. By thus classifying the starting condition, it is possible to request the data processing unit 3 to perform processing when the data processing unit 3 is connected and only perform a page transfer when it is not connected.

Next, the processing of the operation unit 3a included in the data processing unit 3 will be described.

Data stored in the input buffer 3b has a page structure as shown in FIG. 15 such that a record 41a can be traced by a slot 41d which indicates an offset value from the head of a page 41. The slot 41d is positioned in front of a control block 41c positioned at the end of the page 41 for managing information on free spaces and the number of records in the page.

An outline of the processing performed by the operation unit will be explained with reference to FIG. 37. The slot 41d in the page 41 points the respective records 41a having contents of male (M), female (F) and so on. The operation unit 3a maintains pointers pointing records which conform to a search request, deletes other pointers and records the search termination flag 41c.

Next, the processing performed by the DBMS 6 after a data transfer has been completed will be explained.

The processing flow of the DBMS shown in FIG. 17, and the processing flow of the page determining unit shown in FIG. 37 serve as they are for explaining the third embodiment.

After transferring data, the control is given to the page determining unit 6a in the DBMS 6. The page determining unit 6a examines the assigned buffer list 14 and refers to the search termination flag 41e included in the control block 41c in a page transferred to the buffer. If the search termination flag 41e is on, which indicates that the data processing unit 3 has operated, the page determining unit 6a only starts the record editor 6f and examines the next assigned buffer list (step 105 in FIG. 17 and steps 120-125 in FIG. 40).

The outline of the processing of the record selector shown in FIG. 39 and the processing flow of the record selector shown in FIG. 41 also serve as they are for explaining the third embodiment.

The record selector 6e performs processing similar to that of the operation unit 3a which is carried out at step 123 in FIG. 40 and steps 126-130 in FIG. 41.

The outline of the processing of the record editor shown in FIG. 39 and the processing flow of the record editor shown in FIG. 42 further serve as they are for explaining the third embodiment.

The record editor 6f refers to edit condition information 11c, edits selected records in accordance with the edit condition information 11c, and accumulates the edited records in the search and edit results. In the example shown in FIG. 39, the edit condition information 11c includes C2, C4 and C6, which indicates the extraction of the second, fourth and sixth columns.

As described above, the third embodiment also enables the DBMS 6 to perform data search and edit without paying attention to whether or not the data processing unit 3 is connected to the control unit 2.

The meritorious effects produced by the above described third embodiment may be summarized as follows:

(1) The data processing unit can be connected to the control unit at an arbitrary time. In this event, if a page transfer request is received, the data processing unit is requested to perform the processing when it is connected to the control unit while a page transfer is solely performed when it is not connected. This operation allows a page transfer to be normally processed even if the data processing unit is connected to the control unit at an arbitrary time, whereby the user need not pay attention to the connection of the data processing unit.

(2) The data processing unit stores in a page the fact that the processing program has performed a requested record search and the existence of records requested by the processing program, whereby the DBMS can know whether the data processing unit has performed the record search on the page, which record in the page the record search has been performed, and so on.

(3) The page determining unit of the DBMS examines whether or not a transferred page has been edited by the data processing unit, extracts edited records from the page when it has been edited by the data processing unit and delivers the same to the processing program, thereby preventing a single page from being searched twice.

As explained above, according to the present embodiment, it is possible to connect the data processing unit to the control unit at an arbitrary time and normally perform a page transfer request even if the data processing unit is connected to the control unit at any time, which allows the user to issue a processing request without paying attention to the connection of the data processing unit.

We claim:

1. In a data processing system comprising a computer, a memory unit, a control unit for controlling the access between said computer and said memory unit, and a data processing unit optionally connected to said control unit, a data processing method for said control unit comprising the steps of:
   inputting from said computer a search request including a condition for searching for data stored in said memory unit;
   reading data from said memory unit in response to said search request;
   detecting whether or not said data processing unit is connected to said control unit;
   outputting said read data and said search condition to said data processing unit if the result of said detection indicates that said data processing unit is connected to said control unit;
   inputting data satisfying said search condition, and selected from said outputted data from said data processing unit; and
   outputting said inputted data satisfying said search condition to said computer.

2. A data processing method according to claim 1, wherein said data outputted to said computer includes information indicating that said data has been processed by said data processing unit.

3. A data processing method according to claim 1, wherein if the result of said detection indicates that said data processing unit is not connected to said control unit, said control unit outputs data read from said memory unit to said computer.

4. A data processing method according to claim 3, wherein said data outputted to said computer includes information indicating that said data is not processed by said data processing unit.

5. A data processing method for a data processing system comprising a computer, a memory unit, a control unit for controlling the access between said computer and said memory unit and a data processing unit optionally connected to said control unit,
   wherein said computer outputs a search request including a condition for searching for data stored in said memory unit to said control unit;
   said control unit reads data from said memory unit in response to said search request, detects whether or not said data processing unit is connected to said control unit, and outputs said read data and said search condition to said data processing unit when the result of said detection indicates that said data processing unit is connected;
   said data processing unit selects data satisfying said search condition from data inputted from said control unit and outputs said selected data to said control unit; and
   said control unit outputs said data inputted from said processing unit and satisfying said search condition.

6. A data processing method according to claim 5, wherein said data inputted by said computer includes information indicating that said data has been processed by said data processing unit.

7. A data processing method according to claim 5, wherein when said control unit cannot detect that said data processing unit is connected to said control unit, said control unit outputs said data read from said memory unit to said computer.

8. A data processing method according to claim 7, wherein said computer selects data satisfying said search condition from said data inputted from said control unit.

9. A data processing system comprising:
   a memory unit for storing data;
   a computer including means for executing a processing program, means for issuing a search condition including a condition for searching for predetermined data requested by said processing program from data stored in said memory unit, and means for inputting data corresponding to said search request;
   a data processing unit including means for selecting data conforming to said search condition from inputted data, and means for outputting said data selected by said selecting means; and
   a control unit, coupled to said computer and said memory unit and adapted for optional connection to said data processing unit, including means for inputting data from said memory unit, means for detecting whether or not said data processing unit is connected thereto, means for outputting data inputted from said memory unit, in response to said search condition, to said data processing unit when said detecting means detects that said data processing unit is connected thereto, and means for transferring data outputted from said data processing unit to said computer.

10. A data processing system according to claim 9, wherein said data inputted by said computer includes information indicating that said data has been processed by said data processing unit.

11. A data processing system according to claim 9, wherein said control unit further includes means for outputting data inputted from said memory unit to said computer when said detecting means detects that said data processing unit is not connected to said control unit.

12. A data processing system according to claim 11, wherein said data inputted by said computer includes information indicating that said data is not processed by said data processing unit.

13. A data processing system according to claim 12, wherein said computer further comprises means for selecting data conforming to said search condition from said inputted data when said inputted data includes information indicating that said data is not processed by said data processing unit.

14. A data processing system comprising:
- a memory unit for holding data in a form of pages;
- a computer having a processing program which issues a data processing request, and a database management system including a record interface, a record selector and a record editor, and which generates a data operation request in response to receipt of the data processing request;
- a control unit connected to the memory unit and the computer, and including a connection controller, wherein the control unit receives the data operation request from the computer and in response to such receipt reads pages of data from the memory unit; and
- a data processing unit adopted for optional connection to the control unit through the connection controller of the control unit, and including a page edit module, wherein when the data processing unit is connected to the control unit the data processing unit selects records requested by the processing program, stores information indicative of the presence or absence of the requested records in a page and transfers the page back to the control unit, wherein the record interface in the computer examines a page transferred from the control unit, and extracts records requested by the processing program from the transferred page and delivers the extracted records to the processing program base on information stored by the page edit module in the data processing unit.

* * * * *